United States Patent
Hiraoka et al.

(10) Patent No.: US 10,352,365 B2
(45) Date of Patent: Jul. 16, 2019

(54) POWER TRANSMISSION SHAFT AND SPLINE-PROCESSING METHOD

(71) Applicants: Tsuneaki Hiraoka, Shizuoka (JP); Yuichi Asano, Shizuoka (JP); Yuichiro Kitamura, Shizuoka (JP); Kiyohiro Suzuki, Shizuoka (JP)

(72) Inventors: Tsuneaki Hiraoka, Shizuoka (JP); Yuichi Asano, Shizuoka (JP); Yuichiro Kitamura, Shizuoka (JP); Kiyohiro Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 894 days.

(21) Appl. No.: 14/777,881

(22) PCT Filed: Mar. 12, 2014

(86) PCT No.: PCT/JP2014/056453
§ 371 (c)(1),
(2) Date: Sep. 17, 2015

(87) PCT Pub. No.: WO2014/156640
PCT Pub. Date: Oct. 2, 2014

(65) Prior Publication Data
US 2016/0298693 A1    Oct. 13, 2016

(30) Foreign Application Priority Data
Mar. 25, 2013 (JP) ................. 2013-062180

(51) Int. Cl.
| | |
|---|---|
| F16D 1/06 | (2006.01) |
| F16D 3/223 | (2011.01) |
| F16D 3/2245 | (2011.01) |
| F16D 1/072 | (2006.01) |
| B21K 1/06 | (2006.01) |
| F16C 3/02 | (2006.01) |
| F16D 1/10 | (2006.01) |

(52) U.S. Cl.
CPC ................ F16D 1/06 (2013.01); B21K 1/066 (2013.01); F16C 3/02 (2013.01); F16D 1/072 (2013.01);
(Continued)

(58) Field of Classification Search
CPC ......... F16D 2001/103; Y10T 403/7035; Y10T 403/7028; Y10T 403/7026
See application file for complete search history.

(56) References Cited

U.S. PATENT DOCUMENTS

| | | | | |
|---|---|---|---|---|
| 7,374,493 B2 * | 5/2008 | Sakurai | ..................... | F16D 1/06 403/359.6 |
| 7,677,073 B2 * | 3/2010 | Tanabe | ..................... | B21K 1/30 29/893.34 |

(Continued)

FOREIGN PATENT DOCUMENTS

| | | |
|---|---|---|
| EP | 1 533 534 | 5/2005 |
| EP | 1 764 169 | 3/2007 |

(Continued)

OTHER PUBLICATIONS

International Search Report dated Jun. 10, 2014 in International (PCT) Application No. PCT/JP2014/056453.
(Continued)

*Primary Examiner* — Matthieu F Setliff
(74) *Attorney, Agent, or Firm* — Wenderoth, Lind & Ponack, L.L.P.

(57) ABSTRACT

A power transmission shaft including a male spline formed in an outer periphery thereof, and a diameter increasing portion formed on a part of a tooth bottom of the male spline, which is located on an opposite side to an axial end of the power transmission shaft. The tooth bottom of the male spline has a substantially constant circumferential width extending up to an axial region of the diameter increasing
(Continued)

portion. The diameter increasing portion includes a chamfered portion formed in the axial region of the diameter increasing portion, the chamfered portion connecting the tooth bottom and a tooth flank of the male spline to each other to reduce a tooth groove width.

11 Claims, 18 Drawing Sheets

(52) U.S. Cl.
    CPC ............... *F16D 1/10* (2013.01); *F16D 3/223* (2013.01); *F16D 3/2245* (2013.01); *F16D 2001/103* (2013.01); *F16D 2003/22313* (2013.01)

(56) References Cited

U.S. PATENT DOCUMENTS

| | | | | |
|---|---|---|---|---|
| 8,079,912 | B2* | 12/2011 | Matsubara | ............... F16C 3/02 403/359.6 |
| 2005/0107169 | A1 | 5/2005 | Sakurai et al. | |
| 2007/0204669 | A1 | 9/2007 | Tanabe | |
| 2008/0152424 | A1 | 6/2008 | Igarashi et al. | |
| 2009/0082117 | A1 | 3/2009 | Sakurai et al. | |
| 2009/0270187 | A1 | 10/2009 | Matsubara et al. | |

FOREIGN PATENT DOCUMENTS

| | | |
|---|---|---|
| EP | 2 060 813 | 5/2009 |
| JP | 2005-54962 | 3/2005 |
| JP | 2005-103601 | 4/2005 |
| JP | 2005-147367 | 6/2005 |
| JP | 2006-61930 | 3/2006 |
| JP | 2008-95845 | 4/2008 |
| JP | 2009-216173 | 9/2009 |

OTHER PUBLICATIONS

Extended European Search Report dated Jan. 26, 2017 in corresponding European Application No. 14772653.3.
International Preliminary Report on Patentability and Written Opinion of the International Searching Authority dated Sep. 29, 2015 in International Application No. PCT/JP2014/056453.

* cited by examiner

POWER TRANSMISSION SHAFT AND SPLINE-PROCESSING METHOD

TECHNICAL FIELD

The present invention relates to a power transmission shaft and a spline-processing method.

BACKGROUND ART

Shafts serving as power transmission shafts for use in, for example, a drive shaft of an automobile are roughly classified into a solid shaft obtained by processing a solid bar, and a hollow shaft obtained by processing a steel tube or the like in terms of structure. In recent years, there is a need for functional enhancement, such as reduction in weight of a suspension system of an automobile and increase in torsional rigidity and NVH characteristic. Accordingly, the hollow shaft is being increasingly used.

FIG. 1 is an illustration of a drive shaft for a front wheel of an automobile using the solid shaft. A drive shaft 30 includes, as main components, a fixed type constant velocity universal joint 1 arranged on a drive wheel side (the left side of the drawing sheet: hereinafter also referred to as an outboard side), a plunging type constant velocity universal joint 31 arranged on a differential side (the right side of the drawing sheet: hereinafter also referred to as an inboard side), and a solid shaft 12 connecting both the constant velocity universal joints 1 and 31 to each other to enable transmission of torque therebetween. A wheel is steered at the drive shaft 30 for a front wheel, and hence as illustrated in FIG. 1, normally, the fixed type constant velocity universal joint 1, which is capable of forming a large operating angle but is not displaced axially, is used on the outboard side (wheel side), whereas the plunging type constant velocity universal joint 31, which forms a relatively small maximum operating angle but is capable of being displaced axially while forming the operating angle, is used on the inboard side (differential side).

The fixed type constant velocity universal joint 1 is a so-called Rzeppa constant velocity universal joint. The constant velocity universal joint 1 includes, as main components, an outer joint member 2, an inner joint member 3, balls 4, and a cage 5. The plunging type constant velocity universal joint 31 is a so-called double-offset constant velocity universal joint. The constant velocity universal joint 31 includes, as main components, an outer joint member 32, an inner joint member 33, balls 34, and a cage 35. Male splines (including serrations, the same holds true for the following description) 19 and 49 formed in both ends of the solid shaft 12 are respectively connected to a female spline 17 formed in the inner joint member 3 of the fixed type constant velocity universal joint 1, and a female spline 47 formed in the inner joint member 33 of the plunging type constant velocity universal joint 31.

FIG. 13 is an illustration of a drive shaft for a front wheel of an automobile using the hollow shaft. Similarly to the above description, the Rzeppa constant velocity universal joint 1 as a fixed type constant velocity universal joint is used on an outboard side of a drive shaft 60. A configuration of the fixed type constant velocity universal joint 1 is the same as that illustrated in FIG. 1, and hence description thereof is omitted. A tripod constant velocity universal joint 61 as a plunging type constant velocity universal joint is used on an inboard side of the drive shaft 60. The tripod constant velocity universal joint 61 includes, as main components, an outer joint member 62, a tripod member 63 serving as an inner joint member, and rollers 64. The rollers 64 are fitted in a freely rotatable manner to three leg shafts 65 formed on the tripod member 63, and the rollers 64 are accommodated in a freely rollable manner in track grooves 66 formed in the outer joint member 62. Male splines 19 and 79 formed in both ends of a hollow shaft 72 are respectively connected to the female spline 17 formed in the inner joint member 3 of the fixed type constant velocity universal joint 1, and a female spline 77 formed in the tripod member 63 of the plunging type constant velocity universal joint 61.

Irrespective of the solid shaft or the hollow shaft, there are a variety of shapes of an end portion (root portion) of the male spline of the shaft on an opposite side to an axial end thereof. Examples of the shape include a shape obtained by simply hollowing out, as illustrated in FIG. 25a, an outer peripheral surface of a power transmission shaft 100 to form a tooth bottom (also referred to as a valley portion) 102 of a male spline 101 formed in the power transmission shaft 100 (hereinafter referred to as a hollowed-out shape), and a shape obtained by smoothly increasing, as illustrated in FIG. 25b, the diameter of the tooth bottom 102 of the male spline 101 to be continuous with the outer peripheral surface of the power transmission shaft 100 (hereinafter referred to as an upward slope shape). In a case of the upward slope shape of the above-mentioned shapes, a diameter increasing surface 105a provides a stress lessening effect, and it is known that the upward slope shape can increase strength of the power transmission shaft.

Further, examples of the upward slope shape include a shape obtained by increasing a circumferential width of the tooth bottom 102 in an axial region of the diameter increasing portion 105 of the male spline on the opposite side to the axial end (hereinafter referred to as a spear shape), and a shape obtained by forming a constant circumferential width of the valley portion in the axial region of the diameter increasing portion (hereinafter referred to as a boat shape). In the spear shape and the boat shape, there is formed a blunt section for blunting an edge of a corner portion between the diameter increasing surface 105a and a tooth flank 104 adjacent to the diameter increasing surface 105a. With this configuration, stress concentration on the corner portion is lessened, thereby increasing static strength and fatigue strength of the power transmission shaft. Such configuration is disclosed in Patent Document 1.

PRIOR ART DOCUMENTS

Patent Documents

Patent Document 1: JP 2005-147367 A

SUMMARY OF THE INVENTION

Problems to be Solved by the Invention

Incidentally, in recent years, along with a growing interest in environmental issues, for example, tightening of emission control and improvement of fuel efficiency are strongly needed for an automobile. As a part of measures to satisfy the needs, further reduction in weight and further increase in strength are strongly needed for a power transmission shaft such as a drive shaft or a propeller shaft.

As an example for satisfying the needs, a spear shape classified as one of the upward slope shapes is illustrated in FIG. 17 and FIG. 18. As illustrated in FIG. 17, a female spline 117 of an inner joint member 103 and a male spline 119 of a shaft 112 are fitted to each other. A fitting reference surface 124, on which an end-portion chamfered portion 103*a* of the inner joint member 103 is to be brought into abutment, is formed on an opposite side to the axial end adjacent to a spline upward slope portion (hereinafter also referred to as a diameter increasing portion) 120 of the shaft 112. As illustrated in FIG. 18, the spear shape is formed so that a circumferential width of a tooth bottom 119*b* is increased as approaching to the opposite side to the axial end in an axial region of the diameter increasing portion 120 of the male spline 119. As illustrated in FIG. 17, in the spear shape, a range of a tooth flank 119*a* can be secured up to the axial region of the diameter increasing portion 120. Accordingly, an axial position of a fitting end 117*a*, at which stress is liable to be concentrated, can be set in the diameter increasing portion 120 having a diameter larger than a spline small diameter F connecting the tooth bottoms 119*b*, thereby being capable of increasing strength of the shaft 112 and the male spline 119. However, as described later, it has been found out that the male spline 119 having the spear shape has room for improvement in terms of processing and manufacturing cost.

As described above, for the splines of the power transmission shaft, it is important to facilitate the processing and reduce the manufacturing cost while securing accuracy and strength of the splines. However, Patent Literature 1 does not focus on this point.

The present invention has been proposed in view of the above-mentioned problem, and has an object to provide a power transmission shaft and a spline-processing method, which are capable of facilitating processing and reducing manufacturing cost while securing accuracy and strength of splines.

Solutions to the Problems

In order to achieve the above-mentioned object, the inventors of the present invention diligently carried out examinations and test evaluations, and found out the following.

[Root Shape of Spline]

As described above, root shapes of male splines are roughly classified into the upward slope shape and the hollowed-out shape. Of the two shapes, the upward slope shape is advantageous in strength, which enables for a shaft section connected to the root of the male spline to have a dimension larger than the spline small diameter. As described with reference to FIG. 17 and FIG. 18, in the spear shape classified as one type of the upward slope shape, the range of the tooth flank 119*a* of the male spline 119 can be secured up to the axial region of the diameter increasing portion 120. Accordingly, the axial position of the spline fitting end 117*a*, at which stress is liable to be concentrated, can be set in the axial region of the diameter increasing portion 120 having the diameter larger than the spline small diameter F connecting the tooth bottoms 119*b* of the male spline, thereby being capable of increasing strength of the shaft 112 and the male spline 119. With a focus on this point, the spear-shaped spline 119 having the upward slope shape was examined.

[Spline-Forming Method]

In addition, the male spline 119 is advantageous in strength when the corner portion formed between the tooth flank 119*a* and the tooth bottom 119*b* is rounded off. However, when rolling is performed on the male spline 119 having the rounded corner portion, due to the movement of a rack and a workpiece during the rolling, a tooth base (range of the tooth flank close to the tooth bottom 119*b* with respect to a pitch circle diameter) and the vicinity of the tooth bottom 119*b* are liable to be formed into disorderly shapes. In addition, when the hollow shaft has a small thickness, the hollow shaft may be deformed into an elliptical shape, and hence it is difficult to adopt rolling. Meanwhile, in a case of press forming, the corner portion can be processed into a rounded shape with high accuracy through transfer of a die shape. With a focus on this point, the press forming was examined as the spline-forming method.

[Examinations and Test Evaluations]

In order to seek the spline capable of achieving increase in accuracy, strength, and processability and achieving reduction in manufacturing cost based on the above-mentioned examinations along with a concept of press forming the spear-shaped male spline having the upward slope shape, a variety of examinations and test evaluations were carried out. Specifically, as illustrated in FIG. 19 to FIG. 24, for the spear-shaped spline, a variety of press working dies and trial shafts were produced, and test evaluations were carried out.

(1) Test Evaluation 1: Press Forming a Trial Shaft Having a Spline Lower Diameter Smaller than a Spline Large Diameter In current rolling, a shaft, which has such specifications that a spline lower diameter of a semifinished shaft is smaller than a spline large diameter, is formed by rolling to expand the spline large diameter. First, a test evaluation was carried out based on those specifications. As illustrated in FIG. 19, there was produced a trial shaft 112*a* having a spline lower diameter Ga before undergoing press working, which was smaller than a spline large diameter E obtained after undergoing press working. The trial shaft 112*a* was formed by expanding the spline large diameter E, and hence a swell of an excess material (hereinafter also referred to as a swelling) was expected. Accordingly, press forming was performed using a die 122*a* comprising a swelling suppression portion 125 formed in an inner peripheral surface thereof as illustrated in FIG. 20. In this case, a gap between the spline lower diameter Ga and the swelling suppression portion 125 was increased. A large swelling 123 was generated on a root portion H of a trial shaft 112*a*' subjected to the press forming, and it was found out that reduction of the swelling was difficult. Further, in addition to the problem of the swelling, such a problem was found out that the spline large diameter E was highly tensed to cause a crack, and to cause irregular heights of tooth tips 119*c*. Note that, the reason why the gap between the spline lower diameter Ga and the swelling suppression portion 125 is increased resides in such a shape that an axial distance between the diameter increasing portion 120 of the male spline 119 and the fitting reference surface 124 is set to be smaller than an axial length of the swelling suppression portion 125. Thus, in order to avoid interference between the swelling suppression portion 125 and an outer diameter I of the fitting reference surface 124, it is necessary to set a dimension of the swelling suppression portion 125 to be slightly larger than the outer diameter I. As a result, the gap between the spline lower diameter Ga and the swelling suppression portion 125 is increased.

(2) Test Evaluation 2: Press Forming a Trial Shaft Having a Spline Lower Diameter Larger than a Spline Large Diameter As measures against the above-mentioned problem, as illustrated in FIG. 21, there was produced a trial shaft 112*b* having a spline lower diameter Gb before undergoing press working, which was larger than a spline large diameter E obtained after undergoing press working. The trial shaft 112*b* was press-formed using a die 122*b* having no swelling suppression portion as illustrated in FIG. 22. In this case, in a shaft 112b' subjected to the press forming, as indicated by the outline arrow of FIG. 22, a material extruded when forming the tooth bottom 119b was extruded in an advancing direction (the rightward direction of the drawing sheet) of a die 122b. Accordingly, it was found out that the large swelling 123 was liable to be generated on the root portion H.

(3) Test Evaluation 3: Press Forming a Trial Shaft Having a Spline Lower Diameter Larger than a Spline Large Diameter Using a Die Comprising a Swelling Suppression Portion As measures against the above-mentioned problem, as illustrated in FIG. 23, on the same trial shaft as the trial shaft 112b used in Test Evaluation 2 (satisfying a relationship of spline lower diameter Gb>spline large diameter E), press working was performed so as to crush the swelling 123 using a die 122c comprising the swelling suppression portion 125. However, it was found out that a processing load might be increased to bring reduction in lifetime of the die. Further, as illustrated in FIG. 24a, in a shaft 112b" subjected to the press working of the spline, the swelling 123 was generated on the root portion H (see FIG. 22), and a preparatory processed surface 124' of the fitting reference surface 124 formed when processing the spline lower diameter was also deformed. Similarly to Test Evaluation 2, as indicated by the outline arrow of FIG. 23, the material for forming the tooth bottom 119b was extruded in an advancing direction (the rightward direction of the drawing sheet) of the die 122c along a diameter increasing portion forming surface 126 (in which a tooth bottom width is increased as approaching to the opposite side to the axial end) of the die 122c. As illustrated in FIG. 24b, it was found out that, even when the die comprises the swelling suppression portion 125, radial protruding deformation could not be suppressed within a range involving no obstacle to spline fitting. Therefore, it was found out that it was necessary to remove a part indicated by the cross-hatching of FIG. 24c, which is an enlarged view for illustrating an outer peripheral region J of the swelling 123 and the fitting reference surface 124 illustrated in FIG. 24b, and that turning process as post-processing could not be omitted.

According to Test Evaluation 1 to Test Evaluation 3, in the related-art spear-shaped spline, a female spline of a mating member and the swelling may interfere with each other, thereby being incapable of attaining proper fitting. Accordingly, it was found out that it was necessary to perform the post-processing of removing the swelling by the turning process or the like, and that it was difficult to reduce the manufacturing cost. As a result of carrying out a variety of examinations based on the findings, the inventors of the present invention conceived a novel shape of the spear-shaped spline to arrive at the present invention.

According to one embodiment of the present invention, there is provided a power transmission shaft, comprising: a male spline formed in an outer periphery thereof', and a diameter increasing portion formed on a part of a tooth bottom of the male spline, which is located on an opposite side to an axial end of the power transmission shaft, by gradually increasing an outer diameter dimension of the tooth bottom, the tooth bottom of the male spline having a substantially constant circumferential width extending up to an axial region of the diameter increasing portion, the diameter increasing portion comprising a chamfered portion formed in the axial region of the diameter increasing portion, the chamfered portion connecting the tooth bottom and a tooth flank of the male spline to each other to reduce a tooth groove width, the tooth bottom, the tooth flank, and the chamfered portion each comprising a press-formed surface, and the power transmission shaft satisfying a relationship of C>D, where C represents an axial dimension between a diameter increase start position P1 and a tooth groove width reduction start position P2 of the male spline, and D represents an axial dimension between the tooth groove width reduction start position P2 and a diameter increase finish position P3 of the male spline.

Further, according to one embodiment of the present invention, there is provided a spline-processing method for a power transmission shaft, the power transmission shaft comprising: a male spline formed in an outer periphery thereof', and a diameter increasing portion formed on a part of a tooth bottom of the male spline, which is located on an opposite side to an axial end of the power transmission shaft, by gradually increasing an outer diameter dimension of the tooth bottom, the spline-processing method comprising forming the male spline by press working using a die, the die comprising: a tooth bottom forming surface for forming the tooth bottom of the male spline; a tooth flank forming surface for forming a tooth flank, the tooth bottom forming surface having a substantially constant circumferential width extending up to an axial region of the diameter increasing portion; and a chamfered portion forming surface for forming a chamfered portion in the axial region of the diameter increasing portion, the chamfered portion forming surface connecting the tooth bottom forming surface and the tooth flank forming surface to each other to reduce a tooth groove width, the press working being performed using the die so that a relationship of C>D is satisfied, where C represents an axial dimension between a diameter increase start position P1 and a tooth groove width reduction start position P2 of the male spline, and D represents an axial dimension between the tooth groove width reduction start position P2 and a diameter increase finish position P3 of the male spline.

With the above-mentioned configuration, of an excess material extruded to form the tooth bottom, a part of the excess material extruded in the advancing direction of the die (forward direction) is suppressed by the tooth bottom having the substantially constant width, and the chamfered portion causes the excess material to smoothly flow at the time of forming, thereby being capable of suppressing the swelling and the processing load. Further, an axial position of a spline fitting end of a mating member can be secured in a satisfactorily inner part of the axial region of the diameter increasing portion of the male spline. Accordingly, the strength of the power transmission shaft and the splines can be increased. In addition, the swelling is suppressed, and hence it is possible to omit post-processing of the swelling and the fitting reference surface, which needs to be performed in a case of a spear shape. Therefore, it is possible to facilitate the processing and reduce the manufacturing cost while securing the accuracy and the strength of the splines of the power transmission shaft.

It is desired that the male spline have a tooth tip comprising a surface free from being subjected to press forming using a die. In this case, the processing load at the time of the press forming can be further suppressed in cooperation with the above-mentioned action of the chamfered portion.

It is desired that the power transmission shaft have an angle $\theta 1$ of from 25° to 40°, which is formed by a straight line K connecting the diameter increase start position P1 and the tooth groove width reduction start position P2 of the male spline to each other, and by an axial outline of the tooth bottom of the male spline. When the angle $\theta 1$ is smaller than 25°, a backward inclination angle of the chamfered portion is extremely small, which brings unsatisfactory suppression of the processing load and the swelling. In this case, the backward inclination angle refers to an angle α (see FIG. 5b) formed by the groove bottom and the chamfered portion in a cross-section taken in the axial region of the diameter increasing portion along a line orthogonal to a center line of the groove bottom, and means an angle of the chamfered portion inclined toward the axial end with respect to the groove bottom. In the following description of Specification, the term "backward inclination angle" has the same meaning. On the other hand, when the angle θ1 exceeds 40°, the axial position of the spline fitting end of the mating member cannot be satisfactorily ensured in the inner part of the axial region of the diameter increasing portion of the male spline. Therefore, the strength of the power transmission shaft and the splines is poor, and an advantage of the spear shape cannot be attained, which is not preferred.

The chamfered portion may comprise a flat surface or a curved recessed surface. With this, the chamfered portion causes the excess material to smoothly flow at the time of forming, with the result that the swelling and the processing load can be suppressed.

It is desired that a corner portion connecting the chamfered portion and the tooth bottom to each other or a corner portion connecting the chamfered portion and the tooth flank to each other be rounded off. With this, it is possible to further lessen stress concentration on fitting end portions of the splines.

The power transmission shaft comprises a hollow shaft to be connected to a constant velocity universal joint. Accordingly, it is possible to form, with high accuracy, the splines of the hollow shaft that has a small thickness and is difficult to undergo rolling.

Effects of the Invention

According to the one embodiment of the present invention, it is possible to realize the power transmission shaft and the spline-processing method, which are capable of facilitating the processing and reducing the manufacturing cost while securing the accuracy and the strength of the splines.

BRIEF DESCRIPTION OF DRAWINGS

FIG. 5b is a view for illustrating a cross-section including the two-dot chain line R of FIG. 5a.

FIG. 6a is a horizontal sectional view taken along the line S1-S1 of FIG. 5a.

FIG. 6b is a horizontal sectional view taken along the line S2-S2 of FIG. 5a.

FIG. 6c is a horizontal sectional view taken along the line S3-S3 of FIG. 5a.

FIG. 6d is a horizontal sectional view taken along the line S4-S4 of FIG. 5a.

FIG. 9b is an enlarged view for illustrating a portion Q of FIG. 9a.

EMBODIMENTS OF THE INVENTION

Now, embodiments of the present invention are described with reference to the drawings.

Figure 1:
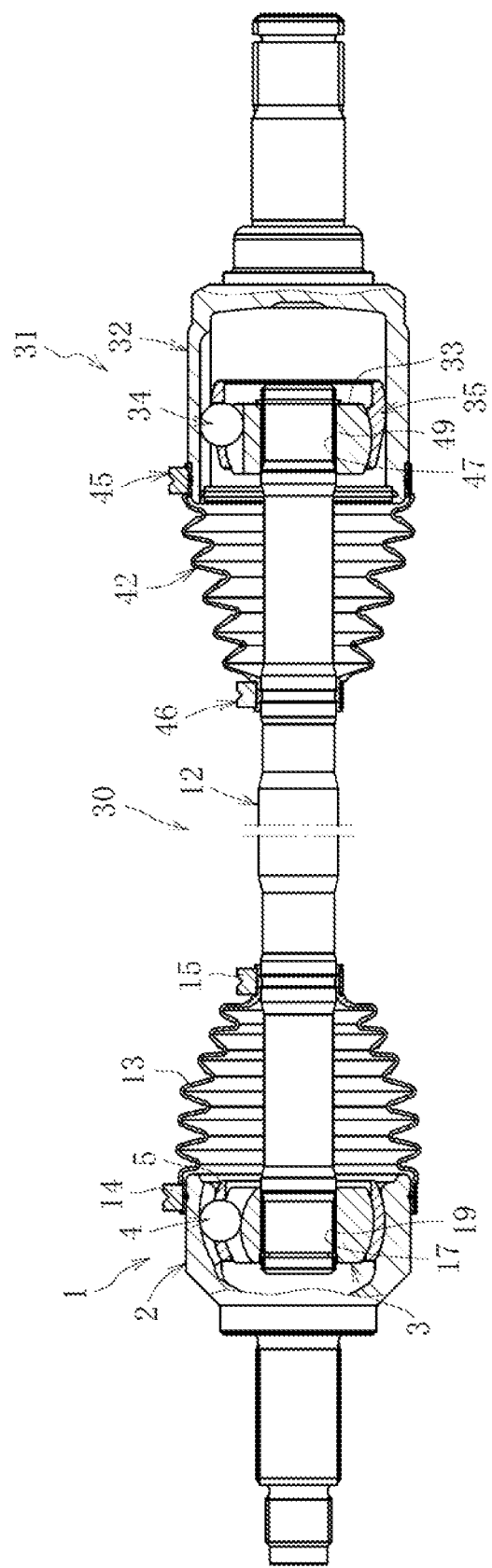
FIG. 1 is a partial vertical sectional view for illustrating a drive shaft for an automobile to which a power transmission shaft according to a first embodiment of the present invention is applied.
Figure 2:
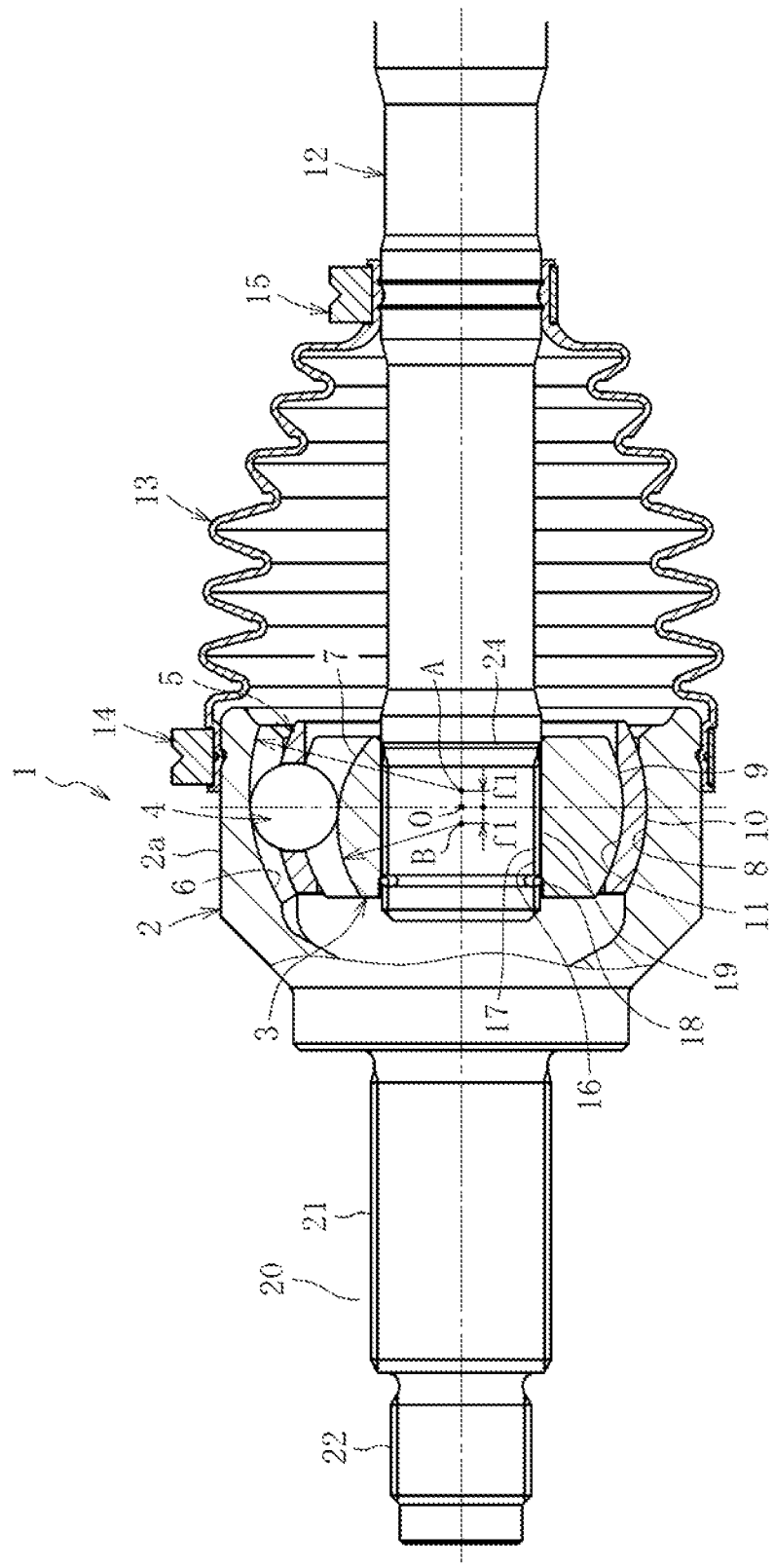
FIG. 2 is a partial vertical sectional view for illustrating a fixed type constant velocity universal joint arranged on an outboard side of the drive shaft.

A power transmission shaft according to a first embodiment of the present invention and a spline-processing method according to an embodiment of the present invention are described with reference to FIG. 1 to FIG. 15. FIG. 1 is an illustration of a drive shaft for a front wheel of an automobile to which the power transmission shaft according to this embodiment is applied. FIG. 2 is an illustration of a fixed type constant velocity universal joint arranged on an outboard side of the drive shaft.

As illustrated in FIG. 1, a drive shaft 30 comprises, as main components, a fixed type constant velocity universal joint 1 arranged on a drive wheel side (the left side of the drawing sheet: hereinafter also referred to as an outboard side), a plunging type constant velocity universal joint 31 arranged on a differential side (the right side of the drawing sheet: hereinafter also referred to as an inboard side), and a solid shaft 12 serving as the power transmission shaft according to this embodiment and connecting both the constant velocity universal joints 1 and 31 to each other to enable transmission of torque therebetween. A wheel is steered at the drive shaft 30 for a front wheel, and hence as illustrated in FIG. 1, normally, the fixed type constant velocity universal joint 1, which is capable of forming a large operating angle but is not displaced axially, is used on the outboard side (wheel side), whereas the plunging type constant velocity universal joint 31, which forms a relatively small maximum operating angle but is capable of being displaced axially while forming the operating angle, is used on the inboard side (differential side).

The fixed type constant velocity universal joint 1 is a Rzeppa constant velocity universal joint. The constant velocity universal joint 1 comprises, as main components, an outer joint member 2, an inner joint member 3, balls 4, and a cage 5. The plunging type constant velocity universal joint 31 is a double-offset constant velocity universal joint. The constant velocity universal joint 31 comprises, as main components, an outer joint member 32, an inner joint member 33, balls 34, and a cage 35. Male splines (comprising serrations, the same holds true for the following description) 19 and 49 formed in both ends of the solid shaft 12 are respectively connected to a female spline 17 formed in the inner joint member 3 of the fixed type constant velocity universal joint 1, and a female spline 47 formed in the inner joint member 33 of the plunging type constant velocity universal joint 31. Bellows boots 13 and 42 are respectively mounted to a portion between an outer peripheral surface of the fixed type constant velocity universal joint 1 and an outer peripheral surface of the shaft 12 and a portion between an outer peripheral surface of the plunging type constant velocity universal joint 31 and the outer peripheral surface of the shaft 12, and are fastened and fixed by boot bands 14, 15, 45, and 46. Grease is sealed inside both the joints as a lubricant.

FIG. 2 is an enlarged partial vertical sectional view for illustrating the fixed type constant velocity universal joint 1 arranged on the outboard side. Eight track grooves 6 are formed in a spherical inner peripheral surface 8 of a mouth section 2a of the outer joint member 2 equiangularly along an axial direction. In a stem section 20 of the outer joint member 2, there are formed a male spline 21 to be connected to a hub wheel (not shown) of a bearing device for a wheel, and a male thread 22 into which a fastening nut (not shown) is threadingly engaged. Track grooves 7 are formed in a spherical outer peripheral surface 9 of the inner joint member 3 equiangularly along the axial direction so as to be opposed to the track grooves 6 of the outer joint member 2. Eight balls 4 for transmitting torque are separately incorporated between the track grooves 6 of the outer joint member 2 and the track grooves 7 of the inner joint member 3. The cage 5 for retaining the balls 4 is arranged between the spherical inner peripheral surface 8 of the outer joint member 2 and the spherical outer peripheral surface 9 of the inner joint member 3. The female spline 17 is formed in an inner peripheral surface 16 of the inner joint member 3, and the male spline 19 of the shaft 12 is fitted to the female spline 17. A fitting reference surface 24 and a snap ring 18 fix the inner joint member 3 and the shaft 12 axially.

Both a curvature center of a spherical outer peripheral surface 10 of the cage 5 to be fitted to the spherical inner peripheral surface 8 of the outer joint member 2, and a curvature center of a spherical inner peripheral surface 11 of the cage 5 to be fitted to the spherical outer peripheral surface 9 of the inner joint member 3 are formed at a joint center O. In contrast, a curvature center A of each of the track grooves 6 of the outer joint member 2, and a curvature center B of each of the track grooves 7 of the inner joint member 3 are offset axially by an equal distance f1 with respect to the joint center O. With this configuration, when the joint forms an operating angle, the balls 4 are constantly guided into a plane bisecting an angle (operating angle) formed by an axis of the outer joint member 2 and an axis of the inner joint member 3, thereby transmitting rotational torque at constant velocity between the two axes. The track grooves 6 and 7 each have a horizontal cross-section formed into an elliptic shape or a Gothic arch shape. The track grooves 6 and 7 and the balls 4 are held in contact with each other at a contact angle (approximately from 30° to 45°), that is, held in so-called angular contact with each other. Therefore, each ball 4 is held in contact with the track grooves 6 and 7 on side surface sides of each of the track grooves 6 and 7 slightly distant from a groove bottom of each of the track grooves 6 and 7.

A shape of the male spline of the power transmission shaft according to this embodiment is described with reference to FIG. 3 to FIG. 6. A root portion of the male spline has the same shape both in the fixed type constant velocity universal joint on the outboard side and the plunging type constant velocity universal joint on the inboard side. Thus, in the following description, a case of the fixed type constant velocity universal joint is described by way of example. The details hold true for the spline of the plunging type constant velocity universal joint on the inboard side, and hence description of a case of the plunging type constant velocity universal joint on the inboard side is omitted.

Figure 3:
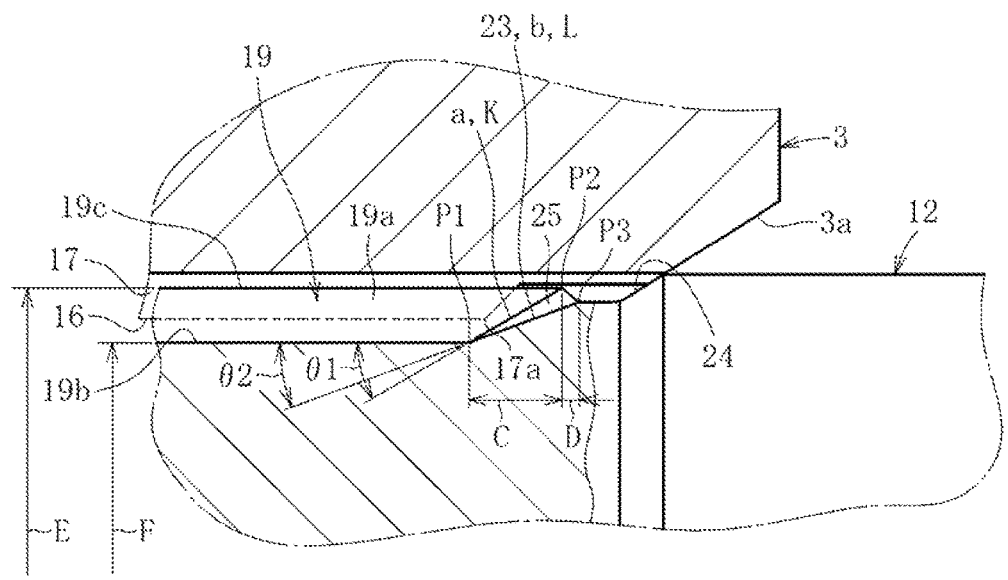
FIG. 3 is an enlarged partial vertical sectional view for illustrating a spline fitting region between the fixed type constant velocity universal joint and the shaft.
Figure 4:
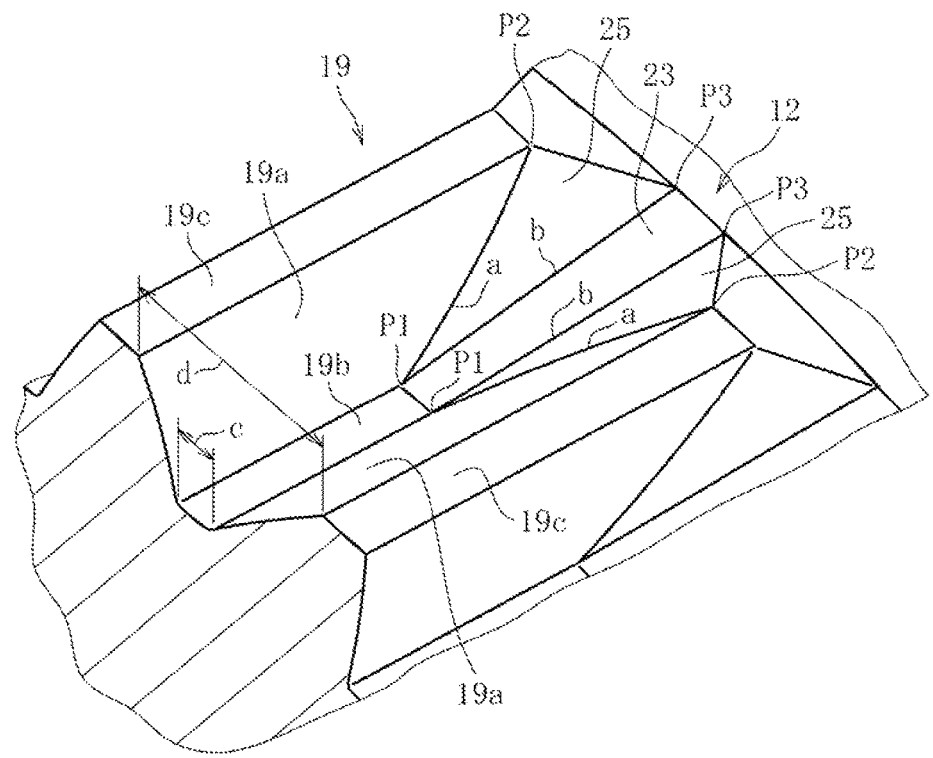
FIG. 4 is a perspective view for illustrating a male spline of the shaft.

FIG. 3 is an enlarged partial vertical sectional view for illustrating a spline fitting region between the inner joint member 3 and the shaft 12 illustrated in FIG. 2. FIG. 4 is a perspective view for illustrating the root portion of the male spline of the shaft. As illustrated in FIG. 3 and FIG. 4, the male spline 19 is formed in an axial end of the shaft 12 serving as the power transmission shaft (on the left side of the drawing sheet), and the female spline 17 is formed in the inner peripheral surface 16 of the inner joint member 3. Both the splines 17 and 19 are fitted to each other. A tooth bottom (valley portion) 19b of the male spline 19 formed in the shaft 12 comprises a diameter increasing portion (upward slope portion) 23 on a root of the male spline on an opposite side to an axial end of the shaft (referring to a side distant from the axial end, and corresponding to the right side of the drawing sheet). The diameter increasing portion 23 is smoothly increased in diameter to be continuous with the outer peripheral surface of the shaft 12. The fitting reference surface 24 is formed on the opposite side to the axial end of the diameter increasing portion 23. The fitting reference surface 24 is brought into abutment on a chamfered portion 3a formed on the inner joint member 3, thereby regulating an axial position of the shaft 12 in a direction of pushing the shaft 12 into the inner joint member 3. The snap ring 18 (see FIG. 2) regulates an axial position of the shaft 12 in a direction of pulling the shaft 12 out of the inner joint member 3.

As illustrated in FIG. 4, the tooth bottom 19b of the male spline 19 is formed so as to have a substantially constant circumferential width c extending up to an axial region of the diameter increasing portion 23. In the axial region of the diameter increasing portion 23, triangular chamfered portions 25 each connecting a tooth flank 19a and the tooth bottom 19b of the spline 19 to each other are formed, and a connecting ridgeline "a" between each chamfered portion 25 and the tooth flank 19a and a connecting ridgeline "b" between each chamfered portion 25 and the tooth bottom 19b are formed. In FIG. 4, the connecting ridgelines "a" and "b" are each indicated by the single solid line, but portions (corner portions) on the connecting ridgelines "a" and "b" may be rounded off as appropriate. A tooth tip (peak portion) 19c of the spline 19 is reduced in diameter from a position on the connecting ridgeline "a" as approaching to the opposite side to the axial end so as to be continuous with the outer peripheral surface of the shaft 12.

As illustrated in FIG. 3 and FIG. 4, the connecting ridgeline "a" between the chamfered portion 25 and the tooth flank 19a, and the connecting ridgeline "b" between the chamfered portion 25 and the tooth bottom 19b intersect at the tooth bottom 19b located at an end portion of the diameter increasing portion 23 on the axial end side. The intersection point corresponds to a diameter increase start position P1 of the male spline 19. An intersection point of the connecting ridgeline "a" and the tooth tip 19c corresponds to a tooth groove width reduction start position P2, and a tooth groove width d is reduced from the tooth groove width reduction start position P2 as approaching to the opposite side to the axial end. An intersection point of the connecting ridgeline "b" and the outer peripheral surface of the shaft 12 corresponds to a diameter increase finish position P3.

As illustrated in FIG. 4, the tooth flank 19a extends from the diameter increase start position P1 to the tooth groove width reduction start position P2 as a width (height) of the tooth flank 19a is reduced. Therefore, as illustrated in FIG. 3, an axial position of a spline fitting end 17a of the inner joint member 3 can be set in the axial region of the diameter increasing portion 23 having a diameter larger than a spline small diameter F connecting the tooth bottoms 19b of the male spline 19 of the shaft 12. Accordingly, strength of the shaft 12 and the male spline 19 can be increased.

As illustrated in FIG. 3, according to this embodiment, when C represents an axial dimension ranging from the diameter increase start position P1 to the tooth groove width reduction start position P2 and D represents an axial dimension ranging from the tooth groove width reduction start position P2 to the diameter increase finish position P3, the axial dimensions C and D are set to satisfy a relationship of C>D. When the axial dimension C is equal to or smaller than the axial dimension D, the axial position of the spline fitting end 17a of the inner joint member 3 cannot be satisfactorily ensured in an inner part of the axial region of the diameter increasing portion 23 of the male spline 19 of the shaft 12 at the time of fitting (on the right side of the drawing sheet). Therefore, strength of the shaft 12 and the male spline 19 is poor, and hence an advantage of a spear shape cannot be attained.

Further, an angle θ1 is formed by a straight line K connecting the diameter increase start position P1 and the tooth groove width reduction start position P2 of the spline to each other, and an axial outline of the tooth bottom 19b of the spline. An angle θ2 is formed by a straight line L connecting the diameter increase start position P1 and the diameter increase finish position P3 of the spline to each other, and the axial outline of the tooth bottom 19b of the spline. In this case, in Specification and Scope of Claims, when the straight line K connecting the diameter increase start position P1 and the tooth groove width reduction start position P2 of the spline is projected onto a plane M (see FIG. 5a) including the axis of the shaft 12 and a center line of the tooth bottom 19b, the angle θ1 is defined as an angle formed by the straight line K and the axial outline of the tooth bottom 19b. Similarly, when the straight line L connecting the diameter increase start position P1 and the diameter increase finish position P3 of the spline to each other is projected onto the plane M including the axis of the shaft 12 and the center line of the tooth bottom 19b, the angle θ2 is defined as an angle formed by the straight line L and the axial outline of the tooth bottom 19b. Therefore, for example, depending on an involute curve of the tooth flank 19a and a form of a surface of the diameter increasing portion 23, the connecting ridgelines "a" and "b" are extremely slightly curved. Accordingly, complete conformity is not obtained between the straight line K and the connecting ridgeline "a" and between the straight line L and the connecting ridgeline "b". However, in FIG. 3, for convenience of illustration, reference symbols K and a, and reference symbols L and b are illustrated in line. On the other hand, in FIG. 4, in order not to complicate illustration, illustration of the straight lines K and L is omitted.

In consideration of an actual upward slope shape, the angle θ2 is set to approximately 20°. On the other hand, in consideration of a spline fitting state and suppression of a processing load and a swelling, the angle θ1 is set to 25° or more to 40° or less. When the angle θ1 is smaller than 25°, a backward inclination angle of the chamfered portion 25 is extremely small, which brings unsatisfactory suppression of the processing load and the swelling. On the other hand, when the angle θ1 exceeds 40°, a width of the tooth flank 19a is reduced in the inner part of the axial region of the diameter increasing portion 23 to an extremely high degree. Accordingly, the axial position of the spline fitting end 17a of the inner joint member 3 cannot be satisfactorily ensured in the inner part of the axial region of the diameter increasing portion 23 of the male spline 19 of the shaft 12 at the time of fitting. Therefore, strength of the shaft 12 and the male spline 19 is poor, and the advantage of the spear shape cannot be attained.

Figure 5A:
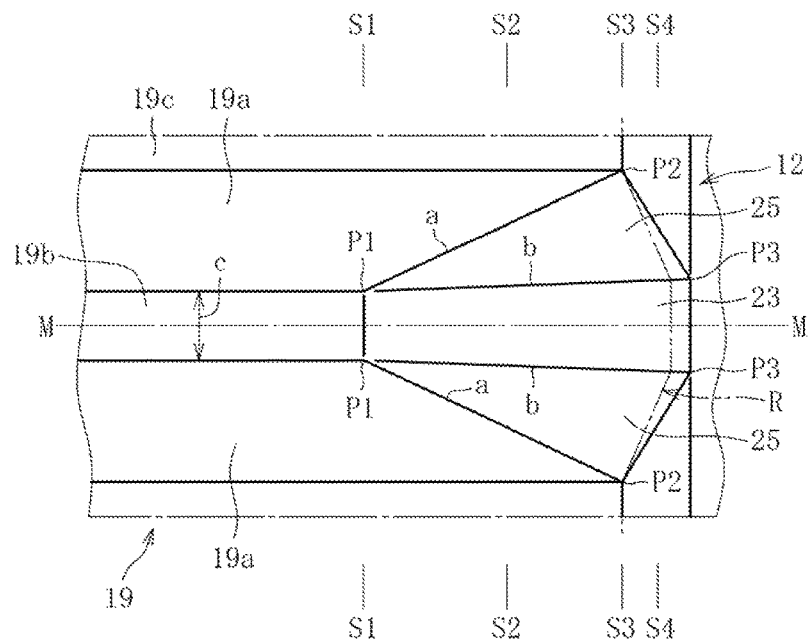
FIG. 5a is a plan view for illustrating details of FIG. 4.
Figure 5B:
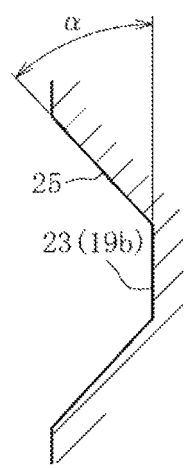

Next, a detail of a sectional shape of the axial region of the diameter increasing portion of the male spline is described with reference to FIG. 5 and FIG. 6. FIG. 5a is a plan view for illustrating a region between a pair of tooth tips, and FIG. 5b is a view for illustrating a cross-section (cross-section including the two-dot chain line R) that passes through the tooth groove width reduction start position P2 illustrated in FIG. 5a and is orthogonal to the center line of the groove bottom. FIG. 6 are horizontal sectional views taken along the line S1-S1 to the line S4-S4 of FIG. 5a. The spline of the power transmission shaft according to this embodiment is basically formed into a spear shape. However, the chamfered portions 25 are formed in the axial region of the diameter increasing portion 23, and hence the tooth bottom 19b is formed so as to have the substantially constant circumferential width c extending up to the axial region of the diameter increasing portion 23. Note that, on the axial end side, the circumferential width c of the tooth bottom 19b may be completely equal to that of the axial region of the diameter increasing portion 23. Alternatively, the circumferential width c may be increased in dimension from the diameter increase start position P1 to the diameter increase finish position P3 of the diameter increasing portion 23 as appropriate, or the circumferential width c may be reduced in dimension in an opposite manner as appropriate. In short, in consideration of the spline fitting state and suppression of the processing load and the swelling, the dimension of the circumferential width c can be set as appropriate. The plane M corresponds to a plane including the center line of the tooth bottom 19b and the axis of the shaft 12, and also refers to the plane M onto which the straight line K and the straight line L described above with reference to FIG. 3 are projected. The straight line K connects the diameter increase start position P1 and the tooth groove width reduction start position P2 of the spline to each other, and the straight line L connects the diameter increase start position P1 and the diameter increase finish position P3 of the spline.

Figure 6A:
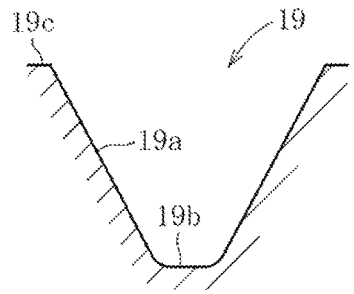
Figure 6B:
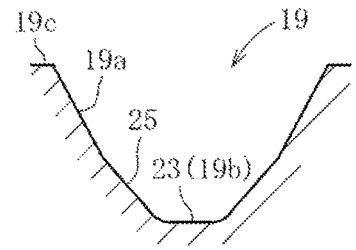
Figure 6C:
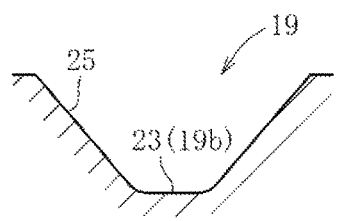
Figure 6D:
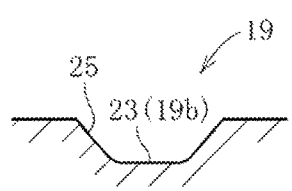

In FIG. 5a, the line S1-S1 indicates the diameter increase start position P1, and the line S2-S2 indicates an intermediate position between the diameter increase start position P1 and the tooth groove width reduction start position P2. Further, the line S3-S3 indicates the tooth groove width reduction start position P2, and the line S4-S4 indicates an intermediate position between the tooth groove width reduction start position P2 and the diameter increase finish position P3. A horizontal cross-section taken along the line S1-S1 of FIG. 5a is illustrated in FIG. 6a, and a horizontal cross-section taken along the line S2-S2 is illustrated in FIG. 6b. Further, a horizontal cross-section taken along the line S3-S3 is illustrated in FIG. 6c, and a horizontal cross-section taken along the line S4-S4 is illustrated in FIG. 6d. FIG. 5b is an illustration of the cross-section (cross-section including the two-dot chain line R) that passes through the tooth groove width reduction start position P2 and is orthogonal to the center line of the tooth bottom 19b. An angle α formed by each chamfered portion 25 and the tooth bottom 19b illustrated in FIG. 5b corresponds to the backward inclination angle, and the chamfered portion 25 is inclined toward the axial end (the left side of the drawing sheet) with respect to the tooth bottom 19b.

In the horizontal cross-section of FIG. 6a taken along the line S1-S1, an entire side surface of the spline ranging from the tooth bottom 19b to the tooth tip 19c serves as the tooth flank 19a, and the same horizontal cross-section is obtained in a range from the axial end (on the left side of FIG. 5a). The horizontal cross-section of FIG. 6b taken along the line S2-S2 is located at a midpoint between the diameter increase start position P1 and the tooth groove width reduction start position P2. In the cross-section of FIG. 6b, the tooth bottom 19b is increased in diameter, and the side surface of the spline 19 is formed of the chamfered portion 25 and the tooth flank 19a. The spline fitting end 17a of the inner joint member 3 is located in a region where the tooth flank 19a is left, thereby enabling spline fitting. In the horizontal cross-section of FIG. 6c taken along the line S3-S3, the side surface of the spline 19 is formed only of the chamfered portion 25. In this state, the tooth bottom 19b is further increased in diameter, with the result that the horizontal cross-section of FIG. 6d taken along the line S4-S4 is obtained.

In FIG. 4 and FIG. 5, the male spline 19 having a linear shape parallel to the axis of the shaft 12 is illustrated, but the present invention is not limited thereto. The male spline 19 may have a slight angle of twist (for example, approximately 5') with respect to the axis of the shaft 12. In this case, a part of a region of the male spline 19 to be fitted to the female spline 17 of the inner joint member 3 as a mating member can be used as an interference, thereby being capable of preventing a backlash in a rotational direction.

The configuration of the male spline 19 is described above. Next, the spline-processing method according to the embodiment of the present invention is described with reference to FIG. 7 to FIG. 12.

Figure 7:
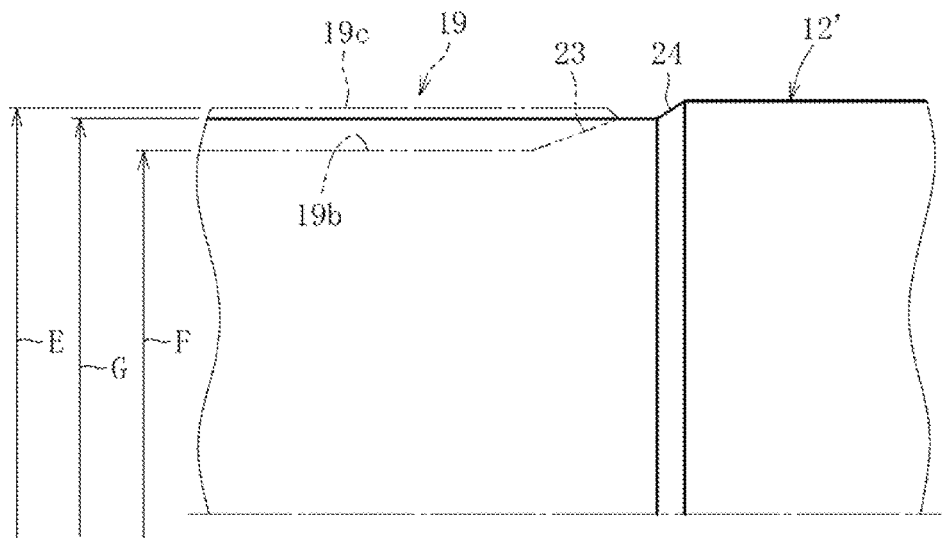
FIG. 7 is an explanatory view for illustrating dimensions obtained before and after the male spline is formed.

FIG. 7 is a schematic view for illustrating a shape of an end portion of the shaft exhibited before and after undergoing press forming. The solid line indicates a semifinished shaft obtained before undergoing press forming, and the two-dot chain line indicates a shape of the male spline exhibited after undergoing press forming. As illustrated in FIG. 7, in this embodiment, there is used a semifinished shaft 12' having a spline lower diameter G before undergoing press forming, which is smaller than a spline large diameter E obtained after undergoing press forming. This reason is described later. On the semifinished shaft 12' obtained before undergoing press forming, the fitting reference surface 24 is formed on the opposite side to the axial end of the spline lower diameter G. In the tooth bottom 19b of the male spline 19 obtained after undergoing press forming, the diameter increasing portion 23 is formed on the opposite side to the axial end.

Figure 8:
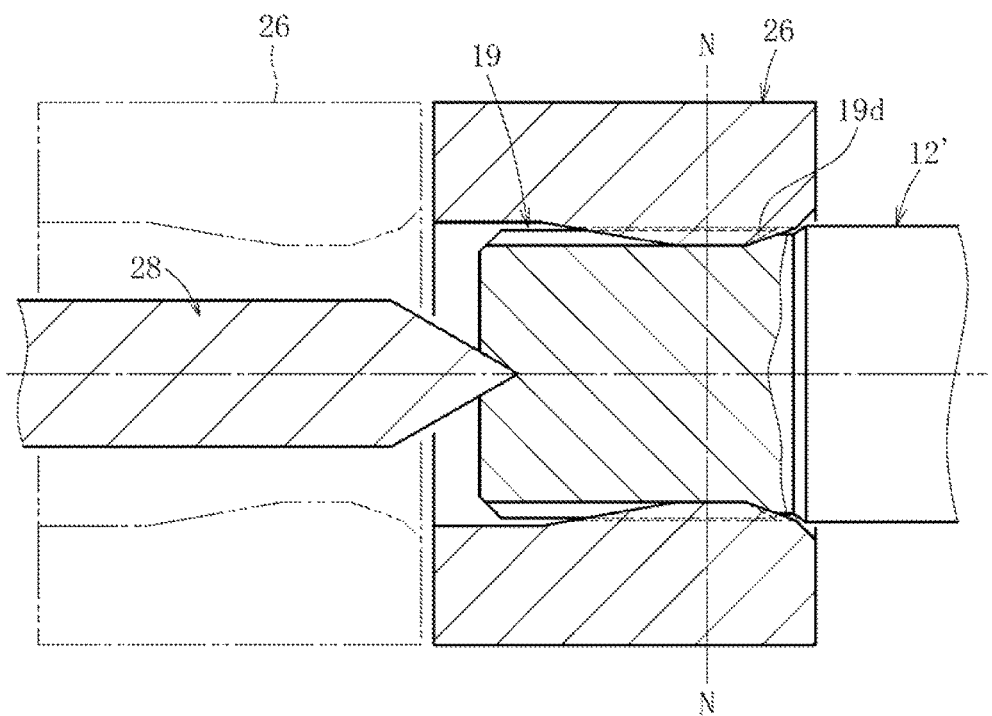
FIG. 8 is a partial vertical sectional view for illustrating a spline-processing method according to an embodiment of the present invention.
Figure 9A:
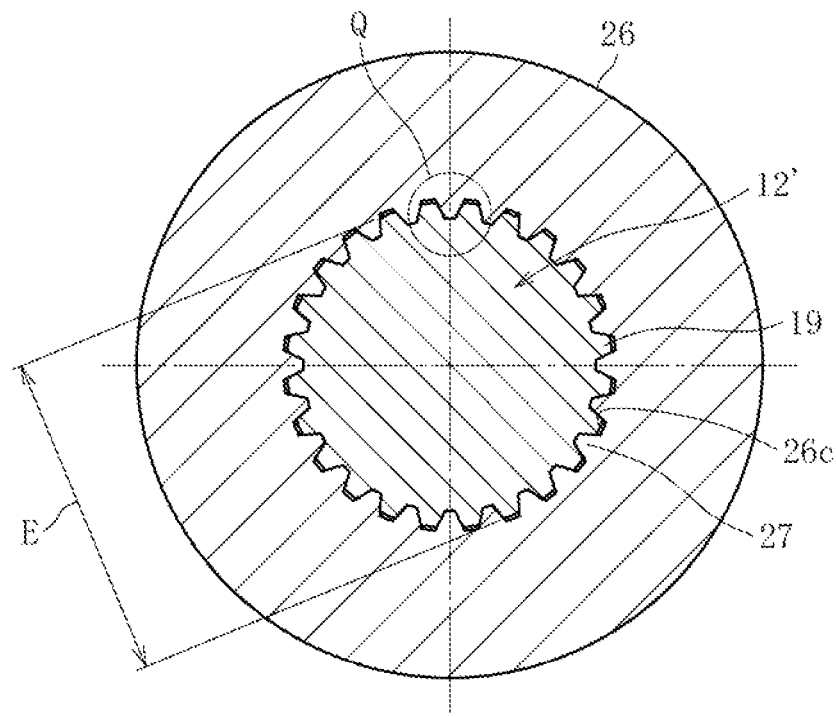
FIG. 9a is a horizontal sectional view taken along the line N-N of FIG. 8.
Figure 9B:
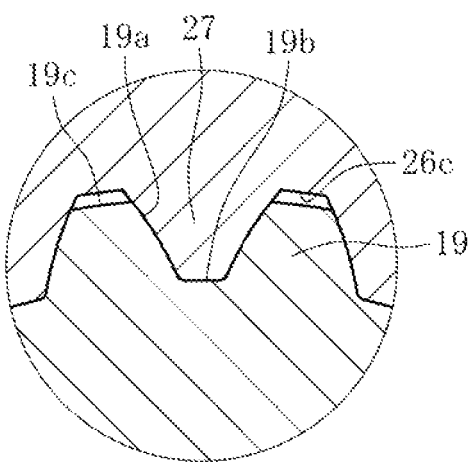

Press forming is performed on the semifinished shaft 12' illustrated in FIG. 7. A summary of press forming is described with reference to FIG. 8 and FIG. 9. FIG. 8 is a partial vertical sectional view for illustrating a press forming state, and FIG. 9 are horizontal sectional views taken along the line N-N of FIG. 8. FIG. 9b is an enlarged view for illustrating a portion Q of FIG. 9a.

As illustrated in FIG. 8, the male spline 19 is formed using a die 26 serving as a processing jig. As illustrated in FIG. 9, the die 26 has a spline forming surface 27 formed on an inner peripheral surface 26c thereof. As illustrated in FIG. 8, under a state in which an axial end of the semifinished shaft 12' is supported by a support section 28, the die 26 is caused to advance from a position indicated by the two-dot chain line, and the die 26 is oscillated axially to alternately advance and retreat in a repeated manner. At this time, an advancing movement amount is larger than a retreating movement amount. In this manner, the die 26 is gradually pushed into the semifinished shaft 12' from the axial end side to the opposite side to the axial end, and the die 26 gradually forms the male spline 19 in the semifinished shaft 12' from the axial end side to a spline root portion 19d.

As illustrated in FIG. 9a and FIG. 9b, in the above-mentioned die 26 for use in press forming, the inner peripheral surface 26c of the die 26 is set to have a diameter larger than the large diameter E of the male spline. Therefore, in press forming, the tooth tip 19c, which protrudes from the spline lower diameter G (see FIG. 7), is set to be located on a radially inner side with respect to the inner peripheral surface 26c of the die 26. With this configuration, the processing load can be further suppressed in cooperation with the above-mentioned action of the chamfered portions 25.

Figure 10:
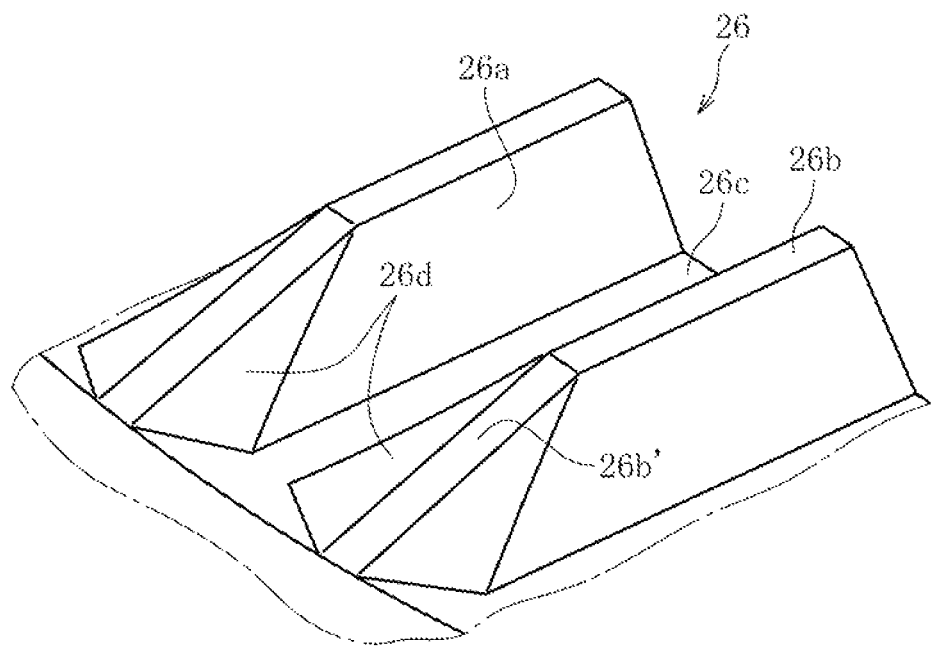
FIG. 10 is a perspective view for illustrating forming surfaces of a die.

The spline forming surfaces of the inner peripheral surface 26c of the die 26 are illustrated in FIG. 10. FIG. 10 is a perspective view for illustrating the inner peripheral surface 26c of the die 26 for forming a vicinity of the root portion of the spline. The inner peripheral surface 26c of the die 26 comprises tooth bottom forming surfaces 26b each for forming the tooth bottom 19b of the male spline 19, tooth flank forming surfaces 26a each for forming the tooth flank 19a, and chamfered portion forming surfaces 26d each connecting each of the tooth bottom forming surfaces 26b and each of the tooth flank forming surfaces 26a. Each of the tooth bottom forming surfaces 26b comprises a diameter increasing portion forming surface 26b' for forming the diameter increasing portion 23 of the male spline 19. With the configurations of the forming surfaces 26a, 26b, 26b', and 26d, each tooth bottom forming surface 26b of the die 26 comprising the diameter increasing portion forming surface 26b' is formed so as to have the substantially constant circumferential width. Further, the die 26 comprises the chamfered portion forming surfaces 26d each connecting the tooth bottom forming surface 26b (diameter increasing portion forming surface 26b') and the tooth flank forming surface 26a to each other and configured to form the chamfered portion in the axial region of the diameter increasing portion 23, thereby obtaining the configurations of the forming surfaces for reducing the tooth groove width. Corner portions at which the forming surfaces 26a, 26b, and 26b' and the inner peripheral surface 26c are connected to each other are rounded off as appropriate. No swelling suppression portion is formed in the inner peripheral surface 26c of the die 26.

Figure 11A:
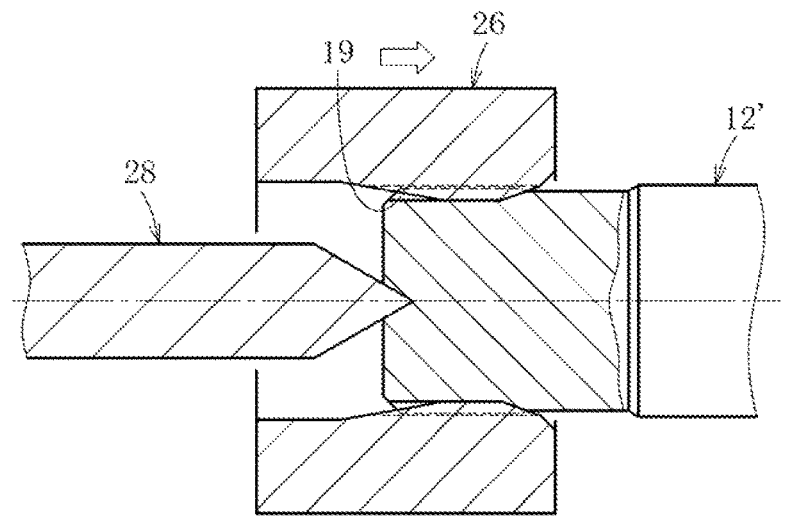
FIG. 11a is a partial vertical sectional view for illustrating a summary of a press forming step of the spline-processing method, and illustrating a state in which the die advances up to a halfway position.
Figure 11B:
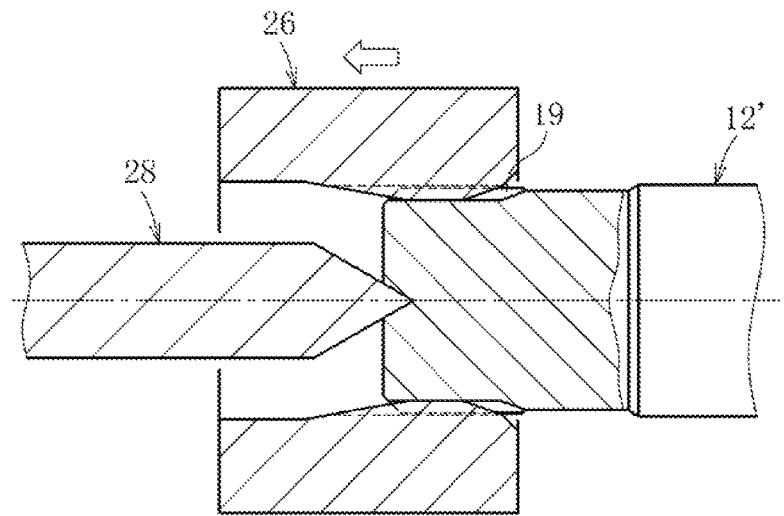
FIG. 11b is a partial vertical sectional view for illustrating the summary of the press forming step of the spline-processing method, and illustrating a state in which the die retreats.
Figure 11C:
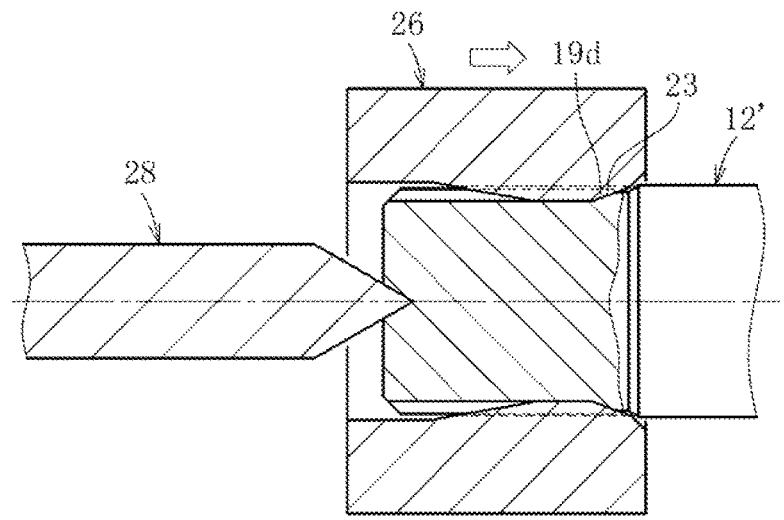
FIG. 11c is a partial vertical sectional view for illustrating the summary of the press forming step of the spline-processing method, and illustrating a state at the time of finish of advancing movement.

Next, processes of press forming are described in detail with reference to FIG. 11. In FIG. 11a, FIG. 11b, and FIG. 11c, states of the processes of press forming are illustrated in sequential order. In FIG. 11, the outline arrows indicate directions of operating the die 26. The right outline arrows of FIG. 11 indicate advancing movement, whereas the left outline arrow of FIG. 11 indicates retreating movement. In other words, advancing movement of the die 26 under axial oscillation is illustrated in FIG. 11a and FIG. 11c, whereas retreating movement of the die 26 under axial oscillation is illustrated in FIG. 11b.

First, as illustrated in FIG. 11a, under a state in which the axial end of the semifinished shaft 12' is supported by the support section 28, the die 26 is caused to advance from the axial end side in a direction indicated by the outline arrow, thereby forming the spline 19 up to an axial halfway position. Subsequently, as illustrated in FIG. 11b, the die 26 is caused to retreat in a direction indicated by the outline arrow, and then the die 26 is caused to advance again. Thus, the die 26 is oscillated axially to alternately advance and retreat in a repeated manner. At this time, the advancing movement amount is larger than the retreating movement amount. In this manner, the die 26 is gradually pushed into the semifinished shaft 12' from the axial end side to the opposite side to the axial end, and the die 26 gradually forms the male spline 19 in the semifinished shaft 12' from the axial end side to the spline root portion 19d.

Then, as illustrated in FIG. 11c, after the predetermined diameter increasing portion 23 is formed on the spline root portion 19d, press forming is finished. In FIG. 11, for convenience of description, there are illustrated three representative states, namely, a state of FIG. 11a for illustrating advancing movement up to the halfway position, a state of FIG. 11b for illustrating retreating movement, and a state of FIG. 11c for illustrating finish of advancing movement. However, actually, the die 26 is oscillated axially to alternately advance and retreat in a repeated manner a few dozen times, thereby forming the spline 19. Note that, after the spline 19 is formed, a snap ring groove and a boot groove are formed in the semifinished shaft 12', and the semifinished shaft 12' is subjected to a heat treatment step and the like to be formed into a finished product.

Figure 12:
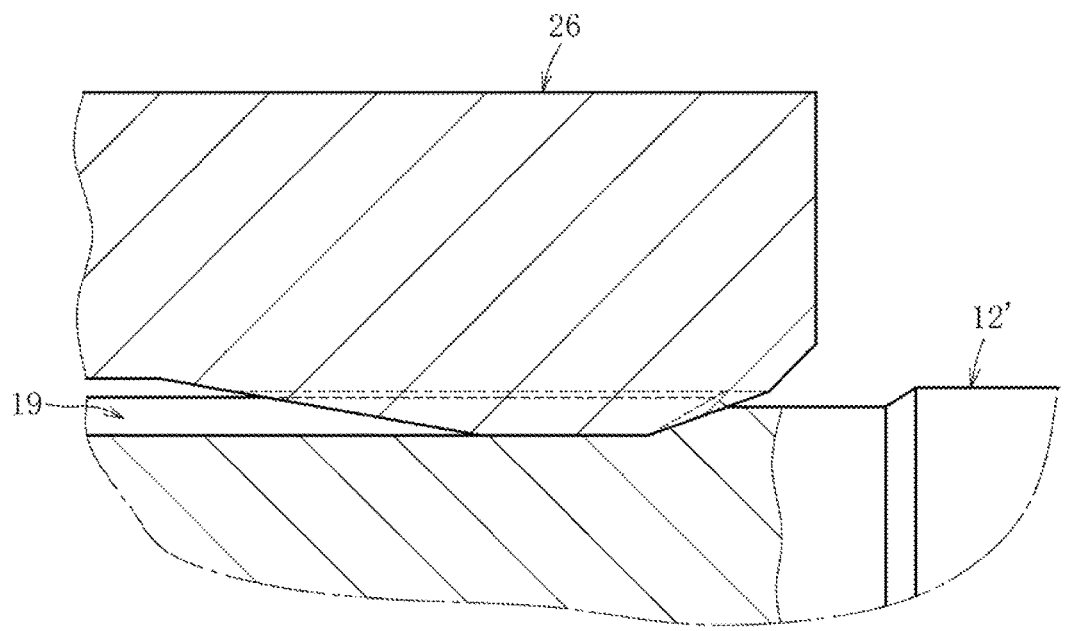
FIG. 12 is a partial vertical sectional view for illustrating a forming state in the press forming step.

In this embodiment, the tooth bottom forming surface 26b of the die 26 comprising the diameter increasing portion forming surface 26b' is formed so as to have the substantially constant circumferential width. Accordingly, of an excess material extruded to form the tooth bottom 19b, a part of the excess material extruded in the advancing direction of the die 26 (forward direction) is suppressed, and the chamfered portion forming surface 26d, which is inclined in a retreating manner, causes the excess material to smoothly flow at the time of forming, with the result that a forward swelling is suppressed as illustrated in FIG. 12. Further, the tooth flank 19a is formed, in a protruding manner, of the excess material extruded toward the chamfered portion forming surface 26d inclined in a retreating manner. Accordingly, even when the spline lower diameter G (see FIG. 7) of the semifinished shaft 12' obtained before undergoing press forming is set to be smaller than the spline large diameter E, the tooth flank 19a can also be formed with high accuracy, and the processing load can also be suppressed. Further, the swelling is suppressed, and hence it is possible to omit post-processing of the swelling and the fitting reference surface, which needs to be performed in a case of a spear shape.

Figure 13:
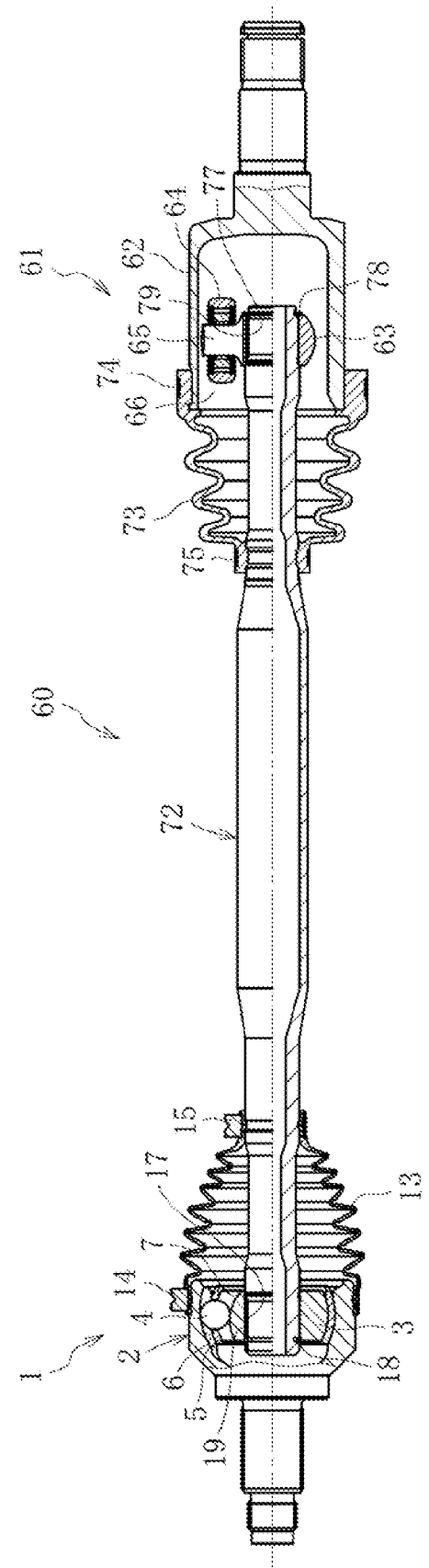
FIG. 13 is a partial vertical sectional view for illustrating a drive shaft for an automobile comprising a hollow shaft to which the power transmission shaft according to the first embodiment of the present invention is applied.

Next, FIG. 13 is an illustration of an example of applying the power transmission shaft according to the first embodiment of the present invention to a hollow shaft of a drive shaft for a front wheel of an automobile. Similarly to FIG. 1, the Rzeppa constant velocity universal joint 1 as a fixed type constant velocity universal joint is used on an outboard side of a drive shaft 60. A configuration of the fixed type constant velocity universal joint 1 is the same as that illustrated in FIG. 1 and FIG. 2, and hence components having the same functions are denoted by the same reference symbols to omit description thereof. A tripod constant velocity universal joint 61 as a plunging type constant velocity universal joint is used on an inboard side of the drive shaft 60.

The tripod constant velocity universal joint 61 comprises, as main components, an outer joint member 62, a tripod member 63 serving as an inner joint member, and rollers 64. The rollers 64 are fitted in a freely rotatable manner to three leg shafts 65 formed on the tripod member 63, and the rollers 64 are accommodated in a freely rollable manner in track grooves 66 formed in the outer joint member 62. Male splines 19 and 79 formed in both ends of a hollow shaft 72 serving as the power transmission shaft according to this embodiment are respectively connected to the female spline 17 formed in the inner joint member 3 of the fixed type constant velocity universal joint 1, and a female spline 77 formed in the tripod member 63 of the plunging type constant velocity universal joint 61.

Figure 14:
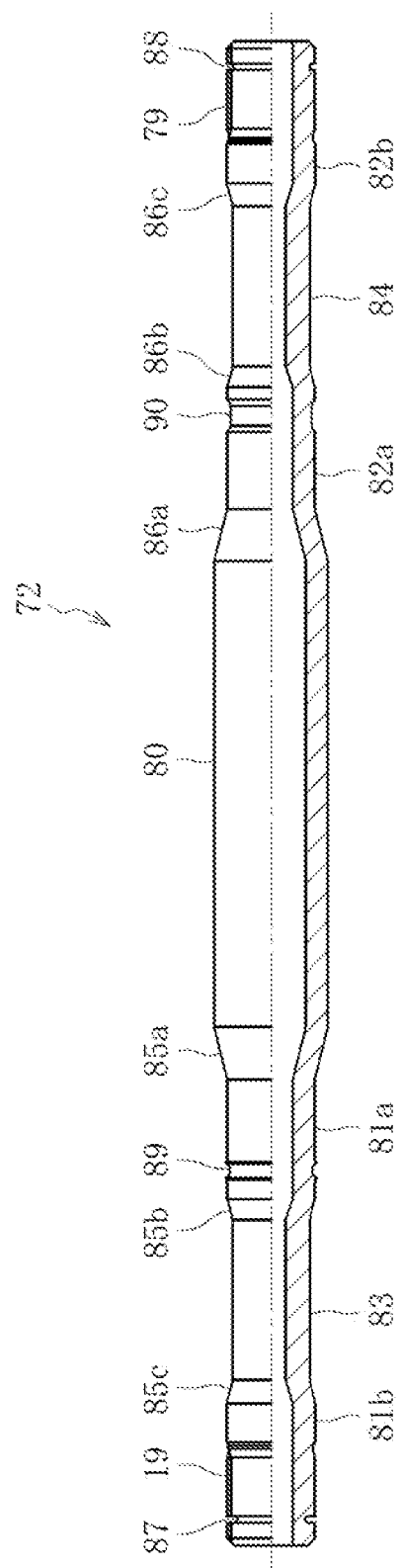
FIG. 14 is an enlarged partial vertical sectional view for illustrating the hollow shaft.

As illustrated in FIG. 14, the hollow shaft 72 is formed of a hollow tubular member extending over an entire axial length thereof. The hollow shaft 72 comprises a large-diameter portion 80 formed in an axial intermediate portion thereof, small-diameter portions 81b and 82b respectively formed on both axial end sides of the large-diameter portion 80, small-diameter portions 81a and 82a respectively formed on sides close to the axial intermediate portion, a smallest-diameter shaft portion 83 formed between the small-diameter portions 81*a* and 81*b*, and a smallest-diameter shaft portion 84 formed between the small-diameter portions 82*a* and 82*b*. The large-diameter portion 80 and the small-diameter portion 81*a* are continuous with each other through a tapered portion 85*a*, and the large-diameter portion 80 and the small-diameter portion 82*a* are continuous with each other through a tapered portion 86*a*. The small-diameter portion 81*a* or 81*b* and the smallest-diameter shaft portion 83 are continuous with each other through a tapered portion 85*b* or 85*c*. The small-diameter portion 82*a* or 82*b* and the smallest-diameter shaft portion 84 are continuous with each other through a tapered portion 86*b* or 86*c*. In an end portion of the small-diameter portion 81*b*, there are formed the spline 19 to be connected to the inner joint member 3 of the constant velocity universal joint 1, and a snap ring groove 87 into which the snap ring 18 for fixing the inner joint member 3 in the axial direction is mounted. In an end portion of the small-diameter portion 82*b*, there are formed the spline 79 to be connected to the inner joint member 63 of the constant velocity universal joint 61, and a snap ring groove 88 into which the snap ring 78 for fixing the inner joint member 63 in the axial direction is mounted. Boot grooves 89 and 90 for fixing boots are formed in the small-diameter portions 81*a* and 82*a*, respectively.

The hollow shaft 72 is processed in the following method. For example, the large-diameter portion 80 formed in the axial intermediate portion of the hollow shaft 72 is shaped into a steel tube, and the small-diameter portions 81*a*, 81*b*, 82*a*, and 82*b*, the smallest-diameter shaft portions 83 and 84, and the tapered portions 85*a*, 85*b*, 85*c*, 86*a*, 86*b*, and 86*c* are formed by swaging of hammering the steel tube in a diameter direction at high speed so as to reduce the steel tube in diameter while rotating the steel tube about an axial center thereof, or by press working of pushing the steel tube into the die in the axial direction so as to reduce the steel tube in diameter. After that, the splines 19 and 79 are formed in both the end portion of the small-diameter portion 81*b* and the end portion of the small-diameter portion 82*b*, respectively. After the splines 19 and 79 are formed, the snap ring grooves 87 and 88 and the boot grooves 89 and 90 are processed. As illustrated in FIG. 14, the hollow shaft 72 has a small thickness. Thus, it is difficult to adopt rolling because the hollow shaft 72 is deformed into an elliptical shape in a case of forming the splines by rolling.

However, also in the hollow shaft 72, similarly to the above-mentioned power transmission shaft according to the first embodiment of the present invention, the tooth bottom 19*b* of the spline 19 is formed so as to have the substantially constant circumferential width c extending up to the axial region of the diameter increasing portion 23, and the chamfered portion 25 connecting the tooth bottom 19*b* and the tooth flank 19*a* of the spline 19 to each other is formed in the axial region of the diameter increasing portion 23, thereby reducing the tooth groove width d. Further, the tooth bottom 19*b*, the tooth flank 19*a*, and the chamfered portion 25 are formed of surfaces formed by press forming, and the axial dimension C between the diameter increase start position P1 and the tooth groove width reduction start position P2 of the spline 19 of the power transmission shaft, and the axial dimension D between the tooth groove width reduction start position P2 and the diameter increase finish position P3 is set to satisfy the relationship of C>D. Therefore, also in the male spline 19 (79) of the hollow shaft 72, the tooth flank can be formed with high accuracy, and fitting is obtained in the inner part of the axial region of the diameter increasing portion, thereby being capable of increasing strength and also suppressing the processing load. Further, the swelling is suppressed, and hence it is possible to omit post-processing of the swelling and the fitting reference surface, which needs to be performed in a case of a spear shape. Therefore, the present invention is preferably applied to the hollow shaft.

A configuration, operation, and the like of the splines of the hollow shaft 72, and a spline-processing method for the shaft are the same as those of the power transmission shaft according to the first embodiment and the spline-processing method according to the embodiment of the present invention. Accordingly, all the details described above in the embodiments are applied mutatis mutandis to the hollow shaft 72, and description thereof is omitted.

Figure 15:
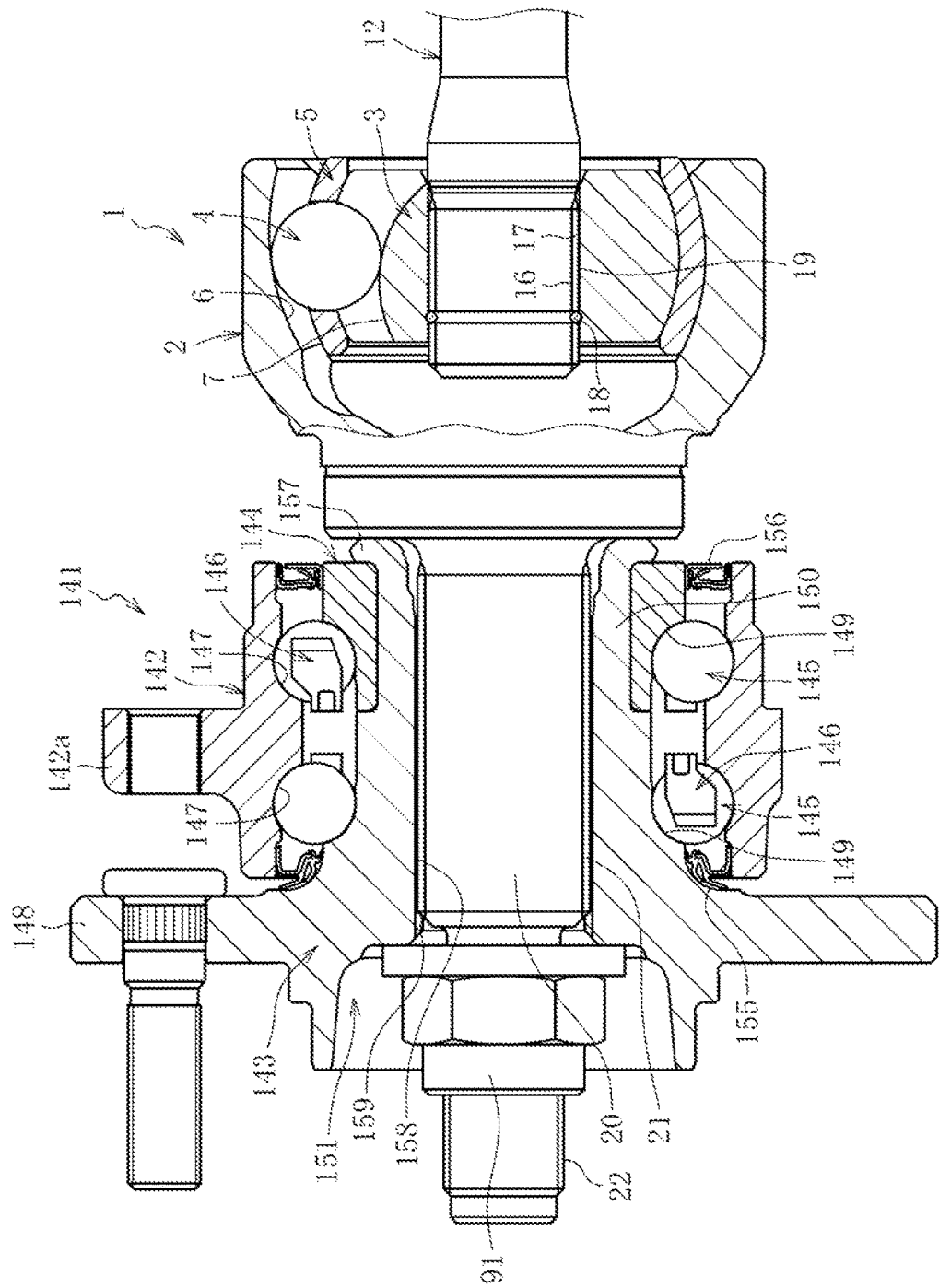
FIG. 15 is a partial vertical sectional view for illustrating a bearing device for a drive wheel of an automobile comprising a stem shaft of a fixed type constant velocity universal joint to which the power transmission shaft according to the first embodiment of the present invention is applied.

Next, FIG. 15 is an illustration of a bearing device for a drive wheel comprising a stem section of a fixed type constant velocity universal joint to which the power transmission shaft according to the first embodiment of the present invention is applied. Also in this case, the fixed type constant velocity universal joint 1 is a Rzeppa constant velocity universal joint, and the constant velocity universal joint 1 comprises the outer joint member 2, the inner joint member 3, the balls 4, and the cage 5 as main components. The six balls 4 are incorporated into the fixed type constant velocity universal joint 1, and the fixed type constant velocity universal joint 1 has the same basic configuration as that illustrated in FIG. 1 and FIG. 2. Accordingly, components having the same functions are denoted by the same reference symbols, and only main points of the fixed type constant velocity universal joint 1 are described.

A bearing device 141 for a wheel comprises, as main components, an outer member 142, a hub wheel 143, an inner ring 144, balls 145 serving as rolling elements, and a cage 146, and has so-called "third generation" structure. In the following description, a side close to an outer side of a vehicle under a state in which the bearing device 141 is mounted to the vehicle is referred to as an outer side (the left side of FIG. 15), and a side close to a center of the vehicle is referred to as an inner side (the right side of FIG. 15). Double-row outer raceway surfaces 147 and 147 are integrally formed on an inner periphery of the outer member 142, and a vehicle body mounting flange 142*a* to be mounted to a knuckle (not shown) of a vehicle body is integrally formed on an outer periphery of the outer member 142. An inner member 151 comprises the hub wheel 143 and the inner ring 144. An inner raceway surface 149 to be opposed to one of the double-row outer raceway surfaces 147 and 147 (on the outer side) of the outer member 142 is directly formed on an outer periphery of the hub wheel 143, and a wheel mounting flange 148, to which a wheel (not shown) is to be mounted, is integrally formed on an outer-side end portion of the hub wheel 143. A cylindrical small-diameter step portion 150 axially extending from the inner raceway surface 149 to the inner side is formed on the outer periphery of the hub wheel 143. The inner ring 144 is press-fitted onto the small-diameter step portion 150 with a predetermined interference. Another inner raceway surface 149 to be opposed to another one of the double-row outer raceway surfaces 147 and 147 (on the inner side) of the outer member 142 is formed on an outer periphery of the inner ring 144. The plurality of balls 145 and 145 are incorporated between the outer raceway surfaces 147 and 147 of the outer member 142 and the inner raceway surfaces 149 and 149 of the inner member 151, and the balls 145 are accommodated in the cage 146 at predetermined circumferential intervals. Seals 155 and 156 are respectively mounted to opening portions of an annular space formed between the outer member 142 and the inner member 151, thereby preventing leakage of lubricating grease sealed inside the bearing, and preventing rainwater, dust, and the like from intruding from an outside of the bearing into an inside thereof.

Under a predetermined bearing preload, the inner ring 144 press-fitted onto the small-diameter step portion 150 of the hub wheel 143 is fixed to the hub wheel 143 in the axial direction by a staked portion 157 formed by plastically deforming an end portion of the small-diameter step portion 150 radially outward.

A female spline 159 is formed in an inner peripheral surface 158 of the hub wheel 143. The male spline 21 formed in the stem section 20 of the constant velocity universal joint 1 is fitted to the female spline 159, and a nut 91 is fastened and fixed to the male thread 22 in a threadingly engaging manner.

Similarly to the power transmission shaft according to the first embodiment of the present invention, the male spline 21 formed in the stem section 20 has the following configuration. Specifically, the tooth bottom of the spline 21 is formed so as to have the substantially constant circumferential width extending up to the axial region of the diameter increasing portion, and the chamfered portion connecting the tooth bottom and the tooth flank of the spline to each other is formed in the axial region of the diameter increasing portion, thereby reducing the tooth groove width. Further, the tooth bottom, the tooth flank, and the chamfered portion are formed of surfaces formed by press forming, and the axial dimension between the diameter increase start position and the tooth groove width reduction start position of the spline 21 is set to be larger than the axial dimension between the tooth groove width reduction start position and the diameter increase finish position. Therefore, also in the male spline 21 of the stem section 20, the tooth flank can be formed with high accuracy, and the processing load can also be suppressed.

As the constant velocity universal joint to be connected to the above-mentioned bearing device for a drive wheel, the fixed type constant velocity universal joint is exemplified, but the present invention is not limited thereto. A plunging type constant velocity universal joint is also applicable. A spline configuration, operation, and the like of the male spline 21, and a spline-processing method are the same as those of the power transmission shaft according to the first embodiment and the spline-processing method according to the embodiment of the present invention. Accordingly, the details described above in the embodiments are applied mutatis mutandis to the male spline 21, and description thereof is omitted.

Figure 16:
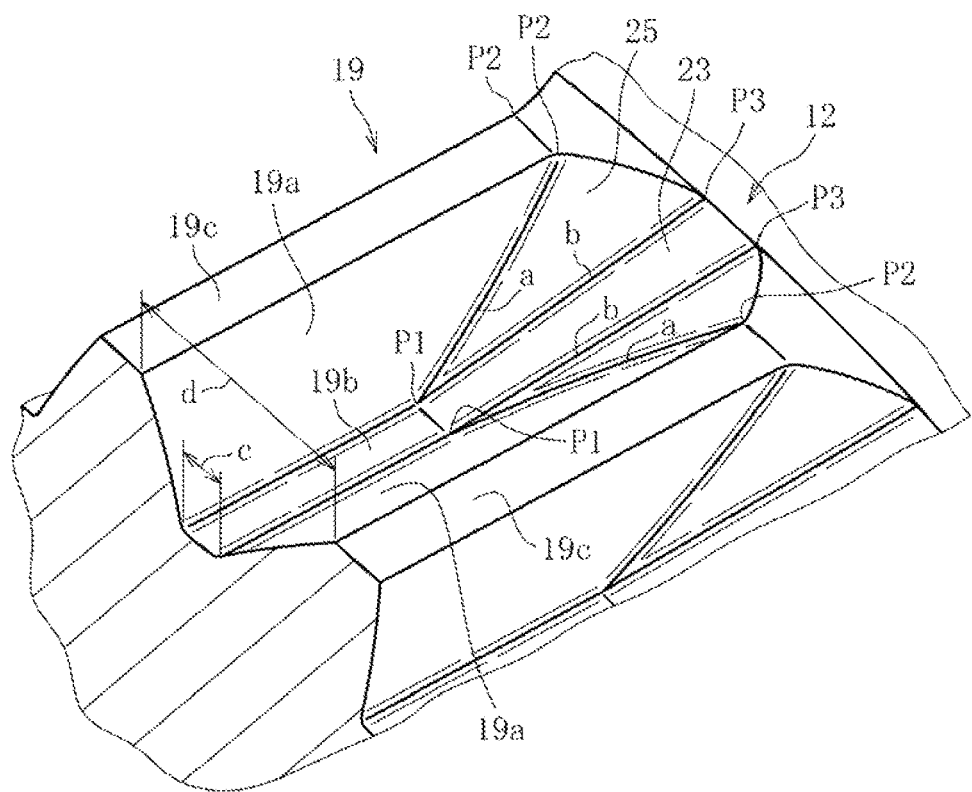
FIG. 16 is a perspective view for illustrating a male spline of a power transmission shaft according to a second embodiment of the present invention.
Figure 17:
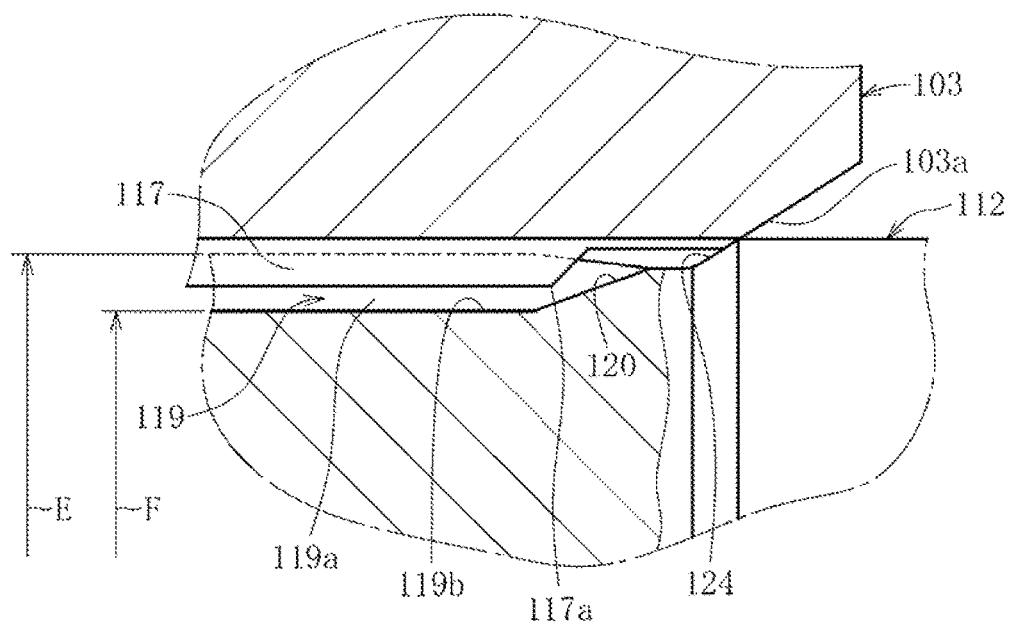
FIG. 17 is a partial vertical sectional view of a spline fitting region for illustrating technical findings found in the process of conceiving the present invention.
Figure 18:
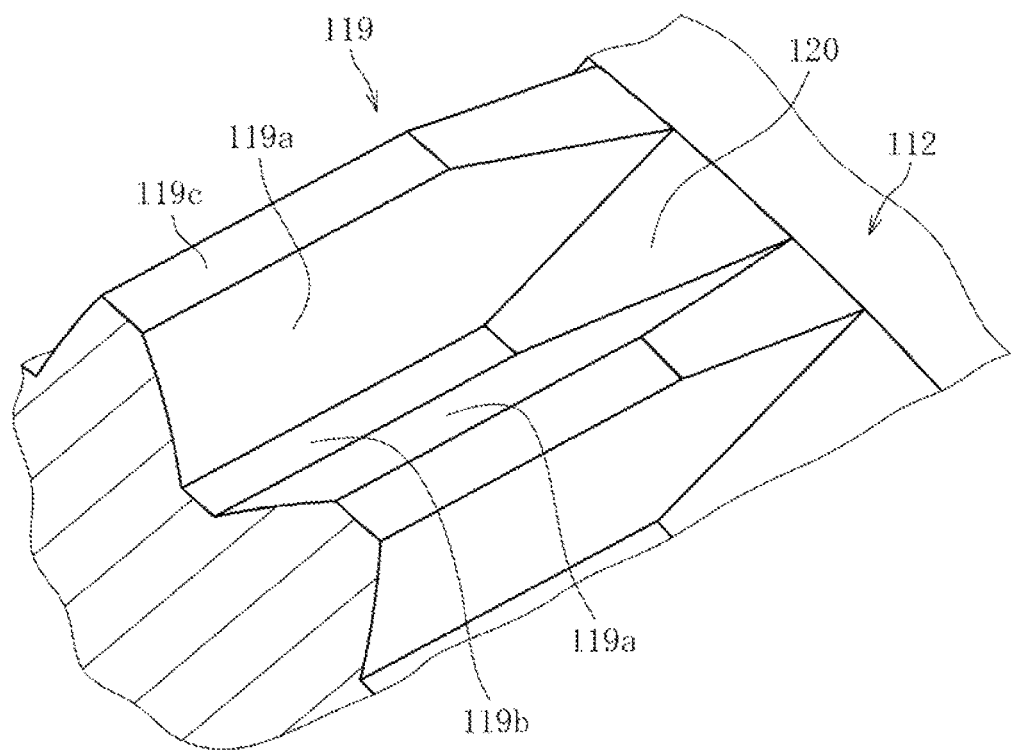
FIG. 18 is a perspective view for illustrating the male spline.
Figure 19:
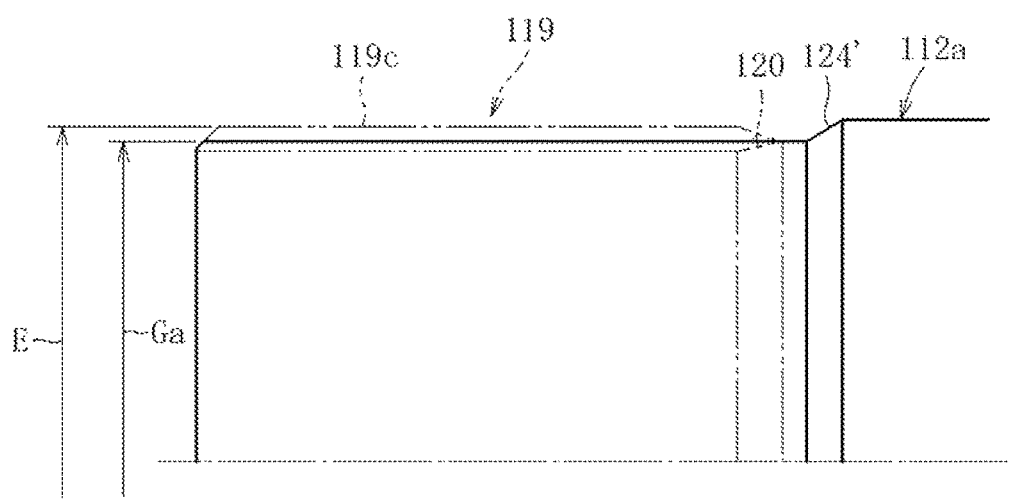
FIG. 19 is an explanatory view for illustrating a spline lower diameter obtained before forming a male spline of a shaft subjected to a test evaluation, and a spline dimension obtained after forming the male spline.
Figure 20:
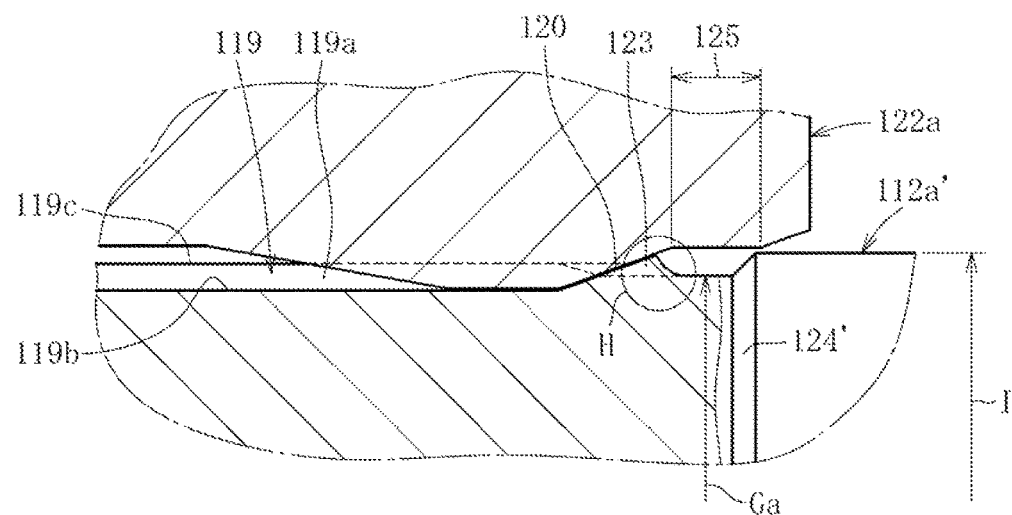
FIG. 20 is a partial vertical sectional view for illustrating a forming state in a step of press forming the shaft subjected to a test evaluation.
Figure 21:
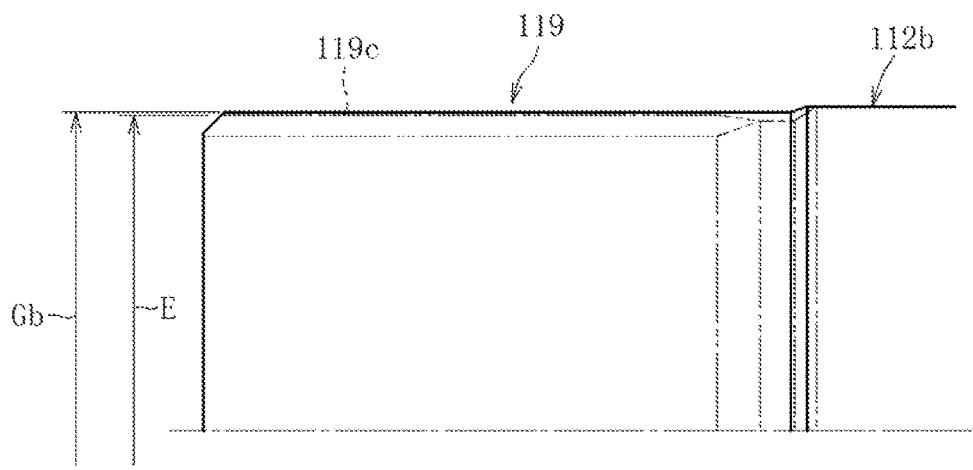
FIG. 21 is an explanatory view for illustrating a spline lower diameter obtained before forming a male spline of a shaft subjected to a test evaluation, and a spline dimension obtained after forming the male spline.
Figure 22:
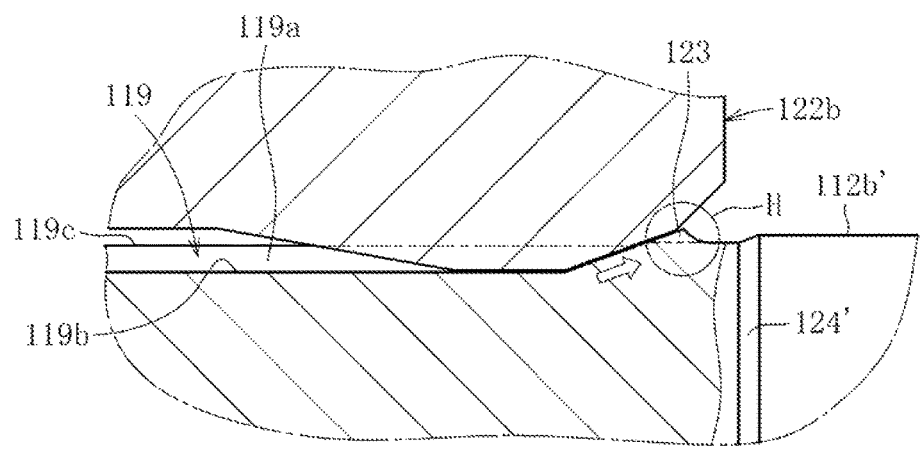
FIG. 22 is a partial vertical sectional view for illustrating a forming state in the step of press forming the shaft subjected to a test evaluation.
Figure 23:
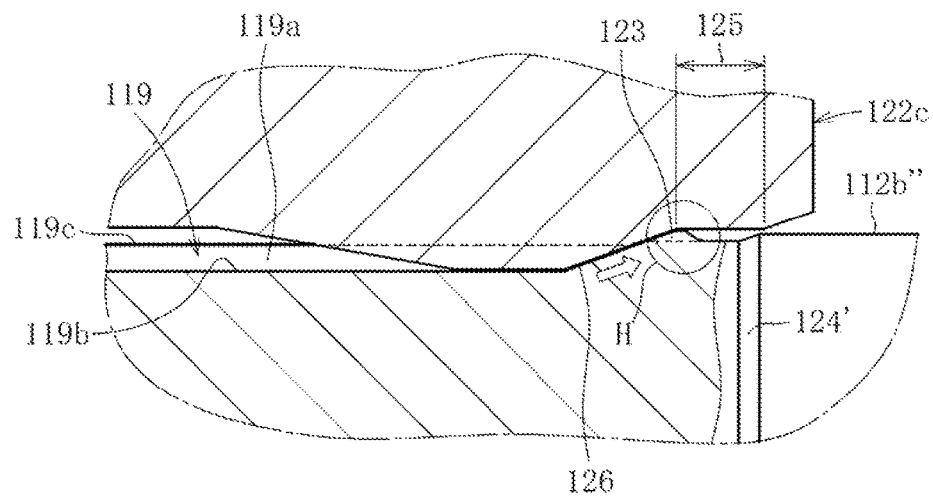
FIG. 23 is a partial vertical sectional view for illustrating a forming state in the step of press forming the shaft subjected to a test evaluation.
Figure 24A:
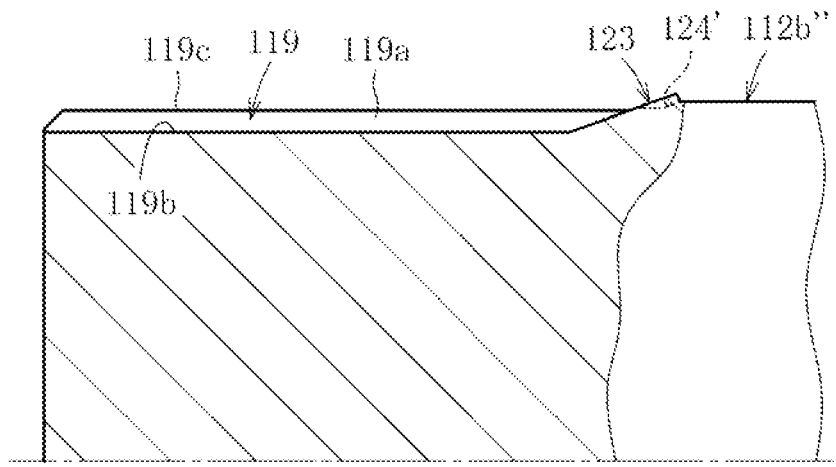
FIG. 24a is a partial vertical sectional view for illustrating the shaft at the time of finish of forming the male spline by press working.
Figure 24B:
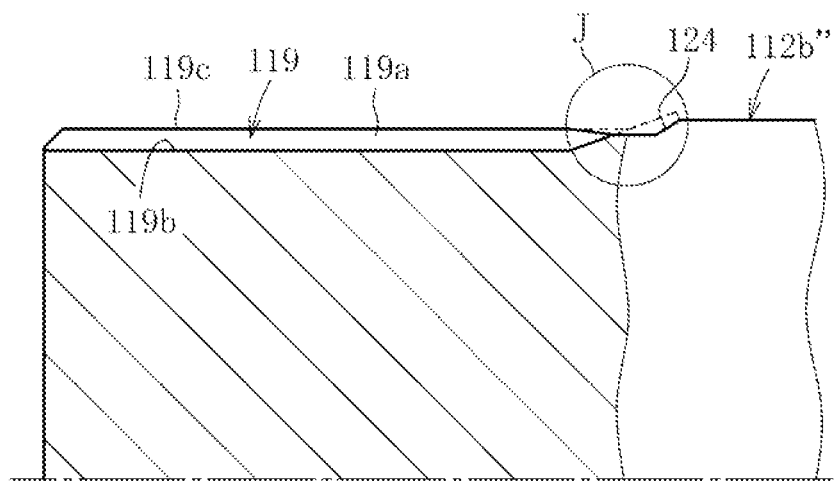
FIG. 24b is a partial vertical sectional view for illustrating a portion of the shaft of FIG. 24a that needs to be subjected to turning process.
Figure 24C:
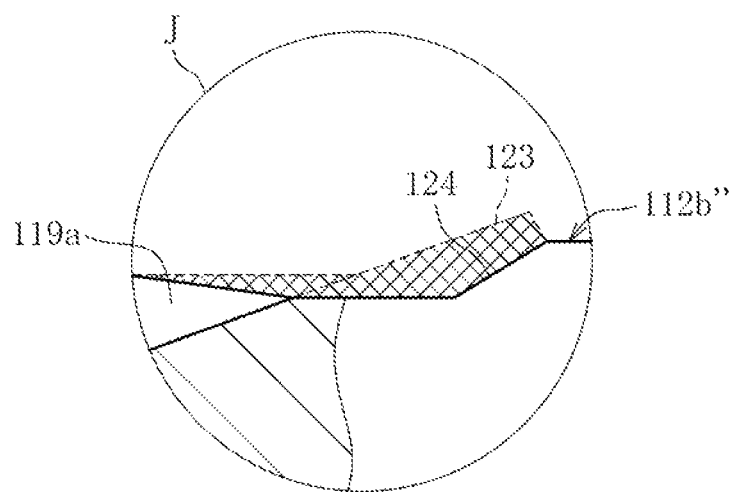
FIG. 24c is an enlarged view for illustrating a circle J of an outer peripheral region of FIG. 24b.
Figure 25A:
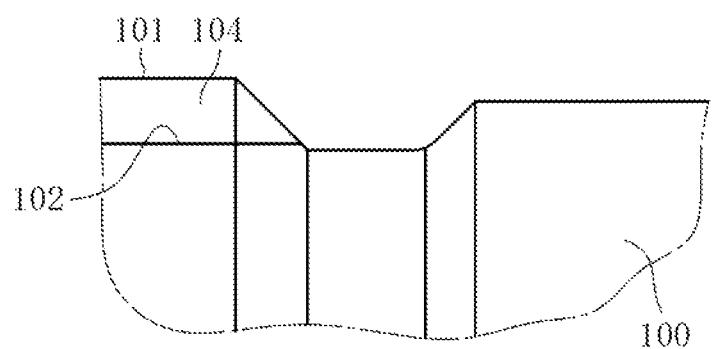
FIG. 25a is a view for illustrating a part of a related-art power transmission shaft.
Figure 25B:
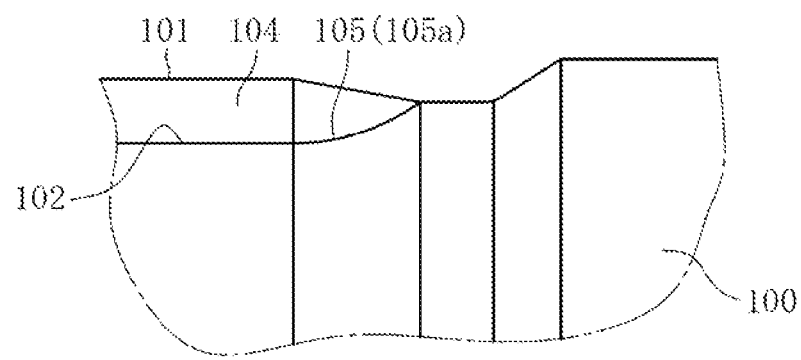
FIG. 25b is a view for illustrating a part of the related-art power transmission shaft.

A power transmission shaft according to a second embodiment of the present invention is described with reference to FIG. 16. The power transmission shaft according to this embodiment is different from the power transmission shaft according to the first embodiment in a form of a chamfered portion of a spline root portion and a connecting ridgeline. The other components are the same as those of the first embodiment. Accordingly, components having the same functions are denoted by the same reference symbols, and repeated description is omitted.

Also in this embodiment, the tooth bottom 19b of the male spline 19 is formed so as to have the substantially constant circumferential width c extending up to the axial region of the diameter increasing portion 23. In the axial region of the diameter increasing portion 23, the chamfered portion 25 connecting the tooth flank 19a and the tooth bottom 19b of the spline 19 to each other is formed, and the connecting ridgeline "a" between the chamfered portion 25 and the tooth flank 19a and the connecting ridgeline "b" between the chamfered portion 25 and the tooth bottom 19b are formed.

The second embodiment is different from the first embodiment in that the chamfered portion 25 is formed into a curved recessed surface, and that corner portions on the connecting ridgelines "a" and "b" are rounded off. The chamfered portion 25 is formed into the curved recessed surface, thereby providing a smooth connecting portion between the tooth flank 19a and the tooth bottom 19b of the spline 19. As a result, the excess material flows further smoothly at the time of press forming, which is advantageous in suppressing the processing load and the swelling. Further, the corner portions indicated by the connecting ridgelines "a" and "b" are rounded off, thereby being capable of further lessening stress concentration on fitting end portions of the splines.

Also in the second embodiment, the other configurations and operation of the splines, and a spline-processing method are the same as those of the power transmission shaft according to the first embodiment and the spline-processing method according to the embodiment of the present invention. Accordingly, all the details described above in the embodiments are applied mutatis mutandis to this embodiment, and description thereof is omitted.

In the embodiments described above, the Rzeppa constant velocity universal joint is exemplified as the fixed type constant velocity universal joint to which the power transmission shaft according to the present invention is applied, but the present invention is not limited thereto. The present invention is also applicable to an undercut-free constant velocity universal joint, a cross-groove constant velocity universal joint, a counter-track constant velocity universal joint, etc. Further, the double-offset constant velocity universal joint and the tripod constant velocity universal joint are exemplified as the plunging type constant velocity universal joint, but the present invention is not limited thereto. The present invention is also applicable to a cross-groove constant velocity universal joint, etc. The joint comprising six balls and the joint comprising eight balls are exemplified as the fixed type constant velocity universal joint, but the present invention is not limited thereto. The present invention may be also implemented in a joint comprising three to five balls, a joint comprising eight balls, and even a joint comprising ten or more balls.

Further, in the embodiments described above, as the power transmission shaft according to the present invention, the drive shaft for an automobile and the stem shaft of the constant velocity universal joint are exemplified, but the present invention is not limited thereto. The present invention may be also applied to a propeller shaft and other types of drive shafts as appropriate.

The present invention is not limited to the above-mentioned embodiments. As a matter of course, the present invention may be carried out in various other embodiments without departing from the gist of the present invention. The scope of the present invention is defined in the claims, and encompasses meanings of equivalents of elements described in the claims and all modifications within the scope of the claims.

DESCRIPTION OF REFERENCE SIGNS 1 fixed type constant velocity universal joint
2 outer joint member
3 inner joint member
4 ball
5 cage 6 track groove
7 track groove
12 shaft
17 female spline
19 male spline
19a tooth flank
19b tooth bottom
19c tooth tip
20 stem section
21 male spline
23 diameter increasing portion
25 chamfered portion
26 die
26a tooth flank forming surface
26b tooth bottom forming surface
26c inner peripheral surface
26d chamfered portion forming surface
30 drive shaft for automobile
31 plunging type constant velocity universal joint
32 outer joint member
33 inner joint member
34 ball
35 cage
47 female spline
49 male spline
60 drive shaft for automobile
61 plunging type constant velocity universal joint
62 outer joint member
63 tripod member
64 roller
72 hollow shaft
77 female spline
79 male spline
141 bearing device for wheel
A curvature center
B curvature center
C axial dimension
D axial dimension
E spline large diameter
F spline small diameter
G spline lower diameter
K straight line
L straight line
M plane
P1 diameter increase start position
P2 tooth groove width reduction start position
P3 diameter increase finish position
c circumferential width of tooth bottom
d tooth groove width

The invention claimed is:

1. A power transmission shaft, comprising:
a male spline formed in an outer periphery thereof; and
a diameter increasing portion formed on a part of a tooth bottom of the male spline, which is located on an opposite side to an axial end of the power transmission shaft, by gradually increasing an outer diameter dimension of the tooth bottom, wherein
the tooth bottom of the male spline has a constant circumferential width extending up to an axial region of the diameter increasing portion,
the diameter increasing portion comprises a chamfered portion formed in the axial region of the diameter increasing portion, the chamfered portion connecting the tooth bottom and a tooth flank of the male spline to each other to reduce a tooth groove width,
the tooth bottom, the tooth flank, and the chamfered portion each comprise a press-formed surface,
the power transmission shaft satisfies a relationship of C>D, where C represents an axial dimension between a diameter increase start position (P1) and a tooth groove width reduction start position (P2) of the male spline, and D represents an axial dimension between the tooth groove width reduction start position (P2) and a diameter increase finish position (P3) of the male spline, and
the power transmission shaft has an angle (θ1) of from 25° to 40°, which is formed by a straight line (K) connecting the diameter increase start position (P1) and the tooth groove width reduction start position (P2) of the male spline to each other, and by an axial outline of the tooth bottom of the male spline.

2. The power transmission shaft according to claim 1, wherein the male spline has a tooth tip comprising a surface free from being subjected to press forming using a die.

3. The power transmission shaft according to claim 2, wherein the chamfered portion comprises a flat surface.

4. The power transmission shaft according to claim 2, wherein the chamfered portion comprises a curved recessed surface.

5. The power transmission shaft according to claim 2, wherein a corner portion connecting the chamfered portion and the tooth bottom to each other or a corner portion connecting the chamfered portion and the tooth flank to each other is rounded off.

6. The power transmission shaft according to claim 2, wherein the power transmission shaft comprises a hollow shaft to be connected to a constant velocity universal joint.

7. The power transmission shaft according to claim 1, wherein the chamfered portion comprises a flat surface.

8. The power transmission shaft according to claim 1, wherein the chamfered portion comprises a curved recessed surface.

9. The power transmission shaft according to claim 1, wherein a corner portion connecting the chamfered portion and the tooth bottom to each other or a corner portion connecting the chamfered portion and the tooth flank to each other is rounded off.

10. The power transmission shaft according to claim 1, wherein the power transmission shaft comprises a hollow shaft to be connected to a constant velocity universal joint.

11. The power transmission shaft according to claim 1, wherein chamfered portion has a triangular shape.

* * * * *